(12) United States Patent  
Lee

(10) Patent No.: US 11,999,298 B2
(45) Date of Patent: Jun. 4, 2024

(54) OPTICAL ASSEMBLY AND REAR-VIEW MIRROR ASSEMBLY COMPRISING SAME

(71) Applicant: LG INNOTEK CO., LTD., Seoul (KR)

(72) Inventor: Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/201,317

(22) Filed: May 24, 2023

(65) Prior Publication Data

US 2023/0294606 A1    Sep. 21, 2023

Related U.S. Application Data

(63) Continuation of application No. 17/791,080, filed as application No. PCT/KR2021/000704 on Jan. 19, 2021, now Pat. No. 11,697,374.

(30) Foreign Application Priority Data

Jan. 23, 2020  (KR) .......................... 10-2020-0009187
Sep. 3, 2020   (KR) .......................... 10-2020-0112442

(51) Int. Cl.
*B60R 1/12*      (2006.01)
*F21K 9/60*      (2016.01)
*F21Y 115/10*    (2016.01)

(52) U.S. Cl.
CPC ................. *B60R 1/12* (2013.01); *F21K 9/60* (2016.08); *F21Y 2115/10* (2016.08)

(58) Field of Classification Search
CPC . B60R 1/12; B60R 1/1207; F21K 9/60; F21Y 2115/10; B60Q 1/2665; B60Q 9/008; G02B 5/08
See application file for complete search history.

(56) References Cited

U.S. PATENT DOCUMENTS 8,708,536 B1 *  4/2014 Mathieu .............. B60Q 1/2665
                                          362/494
9,440,580 B2 *  9/2016 Mathieu .............. B60Q 1/2665
(Continued)

FOREIGN PATENT DOCUMENTS

EP    2933550       10/2015
JP    2004-199930   7/2004
(Continued)

OTHER PUBLICATIONS

International Search Report dated Apr. 13, 2021 issued in Application No. PCT/KR2021/000704.
(Continued)

*Primary Examiner* — Tracie Y Green
(74) *Attorney, Agent, or Firm* — KED & ASSOCIATES, LLP

(57) ABSTRACT

The optical assembly disclosed in the embodiment includes a housing having an inclined bottom surface, a plurality of inner surfaces around an outer periphery of the bottom surface, and a receiving space in which an upper portion is opened; and a lighting module disposed on the inclined bottom surface, wherein the lighting module includes a substrate inclinedly disposed on the inclined bottom surface; at least one light emitting device disposed on the substrate; and a resin layer sealing the light emitting device and the substrate, wherein an upper surface of the resin layer emits light by diffusing light emitted from the light emitting device, wherein the plurality of inner surfaces includes a first inner surface adjacent to the light emitting device, a second inner surface facing the first inner surface, and third and fourth inner surfaces facing each other and disposed between the first and second inner surfaces, wherein a height between the bottom surface of the housing and an upper surface of the housing increases from the first inner surface (Continued)

toward the second inner surface, and decreases from the third inner surface toward the fourth inner surface.

20 Claims, 13 Drawing Sheets

(56) References Cited

U.S. PATENT DOCUMENTS

| | | | |
|---|---|---|---|
| 10,589,675 | B1 | 3/2020 | Huang |
| 11,236,879 | B2 | 2/2022 | Zhang |
| 11,865,969 | B2 * | 1/2024 | Lee .......................... F21K 9/60 |
| 2008/0130306 | A1 | 6/2008 | Bande Martinez |
| 2010/0118509 | A1 | 5/2010 | Kwon et al. |
| 2011/0221588 | A1 | 9/2011 | Foote et al. |
| 2012/0206930 | A1 | 8/2012 | Minikey, Jr. et al. |
| 2014/0185310 | A1 | 7/2014 | Lisowski et al. |
| 2015/0003089 | A1 | 1/2015 | Lynam |
| 2015/0329047 | A1 | 11/2015 | Park et al. |
| 2016/0078768 | A1 | 3/2016 | Huizen et al. |
| 2016/0146420 | A1 | 5/2016 | Yang |
| 2016/0297356 | A1 | 10/2016 | Dellock et al. |
| 2019/0039508 | A1 | 2/2019 | Mi et al. |
| 2019/0135182 | A1 | 5/2019 | Oh et al. |
| 2019/0193638 | A1 | 6/2019 | Park et al. |
| 2019/0351830 | A1 | 11/2019 | Bosma |
| 2022/0055541 | A1 * | 2/2022 | Kobayashi .............. F21S 43/31 |
| 2022/0340082 | A1 | 10/2022 | Doehlert |

FOREIGN PATENT DOCUMENTS

| | | |
|---|---|---|
| JP | 2010-118335 | 5/2010 |
| KR | 10-2016-0062781 | 6/2016 |
| KR | 10-2016-0091867 | 8/2016 |
| TW | I668391 | 8/2019 |

OTHER PUBLICATIONS

U.S. Notice of Allowance dated Feb. 27, 2023 issued in U.S. Appl. No. 17/791,080.
European Search Report dated May 16, 2023 issued in Application No. 21744254.0.

* cited by examiner

OPTICAL ASSEMBLY AND REAR-VIEW MIRROR ASSEMBLY COMPRISING SAME

CROSS-REFERENCE TO RELATED PATENT APPLICATIONS

This application is a Continuation of U.S. application Ser. No. 17/791,080, filed Jul. 6, 2022, which is a U.S. National Stage Application under 35 U.S.C. § 371 of PCT Application No. PCT/KR2021/000704, filed Jan. 19, 2021, which claims priority to Korean Patent Application Nos. 10-2020-0009187, filed Jan. 23, 2020 and 10-2020-0112442, filed Sep. 3, 2020, whose entire disclosures are hereby incorporated by reference.

TECHNICAL FIELD

An embodiment relates to a lighting module having a light emitting device and providing a surface light source.

An embodiment relates to an optical assembly having a lighting module.

Embodiments relate to a rear-view mirror assembly including an optical assembly.

BACKGROUND ART

Typical lighting applications include vehicle lights as well as backlights for displays and signage.

Light emitting devices, for example, light emitting diodes (LEDs) have advantages such as low power consumption, semi-permanent lifespan, fast response speed, safety, and environmental friendliness compared to conventional light sources such as fluorescent lamps and incandescent lamps. Such the light emitting diode is applied to various optical assemblies such as various display devices, indoor lights, or outdoor lights.

Recently, as a light source for a vehicle, a lamp employing a light emitting diode has been proposed. For example, light emitting diodes are being applied to vehicle headlights, tail lights, turn signals, and the like. Since the light emitting diode has a small size, it is possible to increase the design freedom of the lamp. In addition, compared to incandescent lamps, light emitting diodes are advantageous in that they consume less power and have a semi-permanent lifespan.

However, since the directivity angle of light emitted from the light emitting diode is small, when the light emitting diode is used as a vehicle lamp, there is a demand for increasing the light emitting area of the lamp using the light emitting diode.

For example, the light emitting diode may be applied to a blind spot detection (BSD) system. The blind spot detection system is a system that detects other vehicles located behind and to the side of the driver with a sensor device of the vehicle, and provides information about it to the driver through visual, auditory, tactile, and the like. In such the blind spot detection system, a light emitting diode may be disposed in a side mirror, a rear-view mirror, or an A-pillar region of a vehicle to visually provide rear sight information to the driver.

However, as light is emitted in various directions from the light emitting diodes, there is a problem in that visual information is not effectively provided to the driver. In addition, there is a problem in that the light emitted from the light emitting diode may be emitted in the direction of the driver of another vehicle, thereby obstructing the view and causing an accident.

Accordingly, there is a need for a new optical assembly and a blind spot warning device that may solve the above problems.

DISCLOSURE

Technical Problem

An embodiment is to provide an optical assembly capable of improving the luminous intensity of a surface light source and a blind spot warning device.

In addition, an embodiment is to provide an optical assembly capable of improving the uniformity of a surface light source and a blind spot warning device.

In addition, an embodiment is to provide an optical assembly capable of controlling a light exit direction and a blind spot warning device.

In addition, an embodiment is to provide an optical assembly capable of controlling a luminance value of light emitted toward a driver and a luminance value of light emitted toward a vehicle positioned on the side direction and rear direction of the driver, and an optical assembly and blind spot warning device.

Technical Solution

An optical assembly according to an embodiment includes a housing including an inclined bottom surface, a plurality of inner surfaces around an outer periphery of the bottom surface, and a receiving space in which an upper portion is opened, and a lighting module disposed on the inclined bottom surface, wherein the lighting module includes a substrate inclinedly disposed on the inclined bottom surface, at least one light emitting device disposed on the substrate, and a resin layer sealing the light emitting device and the substrate, and an upper surface of the resin layer emits by diffusing the emitted light from the light emitting device, and the plurality of inner surfaces includes a first inner surface adjacent to the light emitting device, a second inner surface facing the first inner surface, and third and fourth inner surfaces disposed between the first and second inner surfaces and facing each other, wherein a height between the bottom surface of the housing and an upper surface of the housing increases from the first inner surface toward the second inner surface, and decreases from the third inner surface toward the fourth inner surface.

In addition, the rear-view mirror assembly according to the embodiment includes a blocking member disposed on an optical assembly and including an opening region and a mirror member disposed on the blocking member, wherein the optical assembly includes a housing including an inclined bottom surface, a plurality of inner surfaces around an outer periphery of the bottom surface, and a receiving space in which an upper portion is opened, and a lighting module disposed on the inclined bottom surface, wherein the lighting module includes a substrate inclinedly disposed on the inclined bottom surface, at least one light emitting device disposed on the substrate, and a resin layer sealing the light emitting device and the substrate, and an upper surface of the resin layer emits by diffusing the emitted light from the light emitting device, and the plurality of inner surfaces includes a first inner surface adjacent to the light emitting device, a second inner surface facing the first inner surface, and third and fourth inner surfaces disposed between the first and second inner surfaces and facing each other, wherein a height between the bottom surface of the housing and an upper surface of the housing increases from the first inner surface toward the second inner surface, and decreases from the third inner surface toward the fourth inner surface.

Advantageous Effects

The optical assembly according to the embodiment may emit light as a surface light source, and may have improved luminous intensity and improved light uniformity. In addition, the optical assembly may prevent a hot spot from being formed and minimize loss of light.

In addition, the lighting module of the optical assembly according to the embodiment may be inclined at a set inclination angle. Accordingly, the optical assembly may control an exit direction of the light emitted from the lighting module and a luminance value according to the exit direction.

In addition, the rear-view mirror assembly according to the embodiment may minimize light loss and maximize light emitted through the mirror member. Also, the rear-view mirror assembly may control an exit direction of the light emitted from the optical assembly and a luminance value of the light according to the exit direction. In detail, the rear-view mirror assembly may control a light exit direction and a luminance value of the light by an optical assembly inclined at a set inclination angle. Accordingly, the rear-view mirror assembly may provide high luminance light to the driver, so that the driver may effectively recognize the logo and/or icon of the indicator. In addition, a relatively low luminance light may be provided to another vehicle located at the rear side of the driver's vehicle, thereby minimizing or preventing the driver of the other vehicle from being disturbed by the light.

BEST MODE

Figure 1:
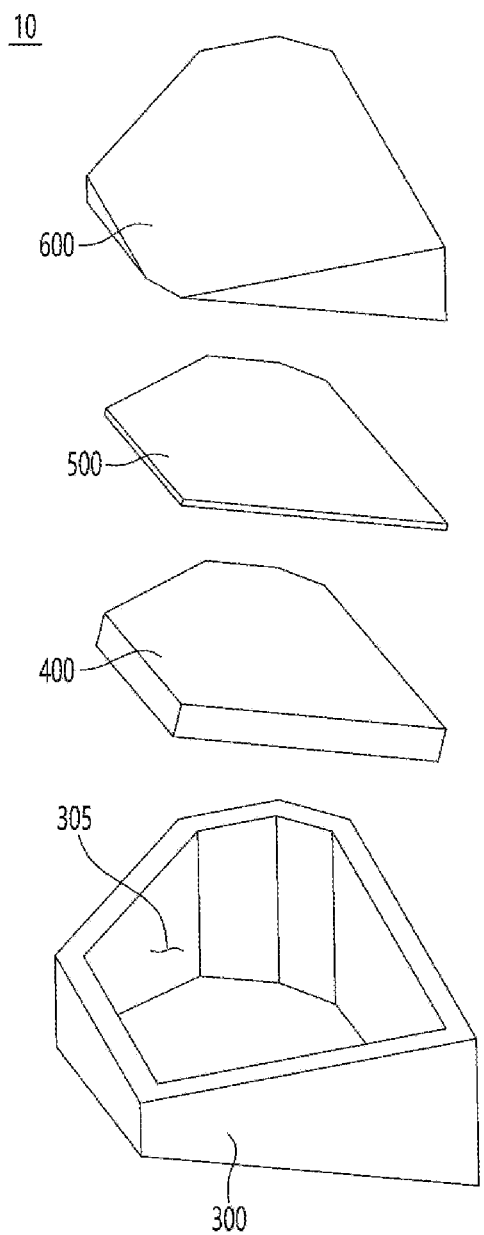
FIG. 1 is an exploded perspective view of an optical assembly according to an embodiment.

Hereinafter, preferred embodiments of the present invention will be described in detail with reference to the accompanying drawings.

The technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The optical assembly according to the present invention may be applied to various lamp devices that require lighting, such as vehicle lamps, home lighting devices, or industrial lighting devices. For example, when applied to vehicle lamps, it is applicable to headlamps, sidelights, side mirrors, fog lights, tail lamps, brake lights, daytime running lights, vehicle interior lights, door scars, rear combination lamps, backup lamps, etc. In addition, when applied to a vehicle lamp, it is applicable to a blind spot detection (BSD) system disposed on a side mirror or an A-pillar. In addition, the optical assembly of the invention may be applied to indoor and outdoor advertising devices, display devices, and various electric vehicle fields, and in addition, it may be applied to all lighting-related fields or advertisement-related fields that are currently developed and commercialized or that may be implemented according to future technological developments.

Figure 2:
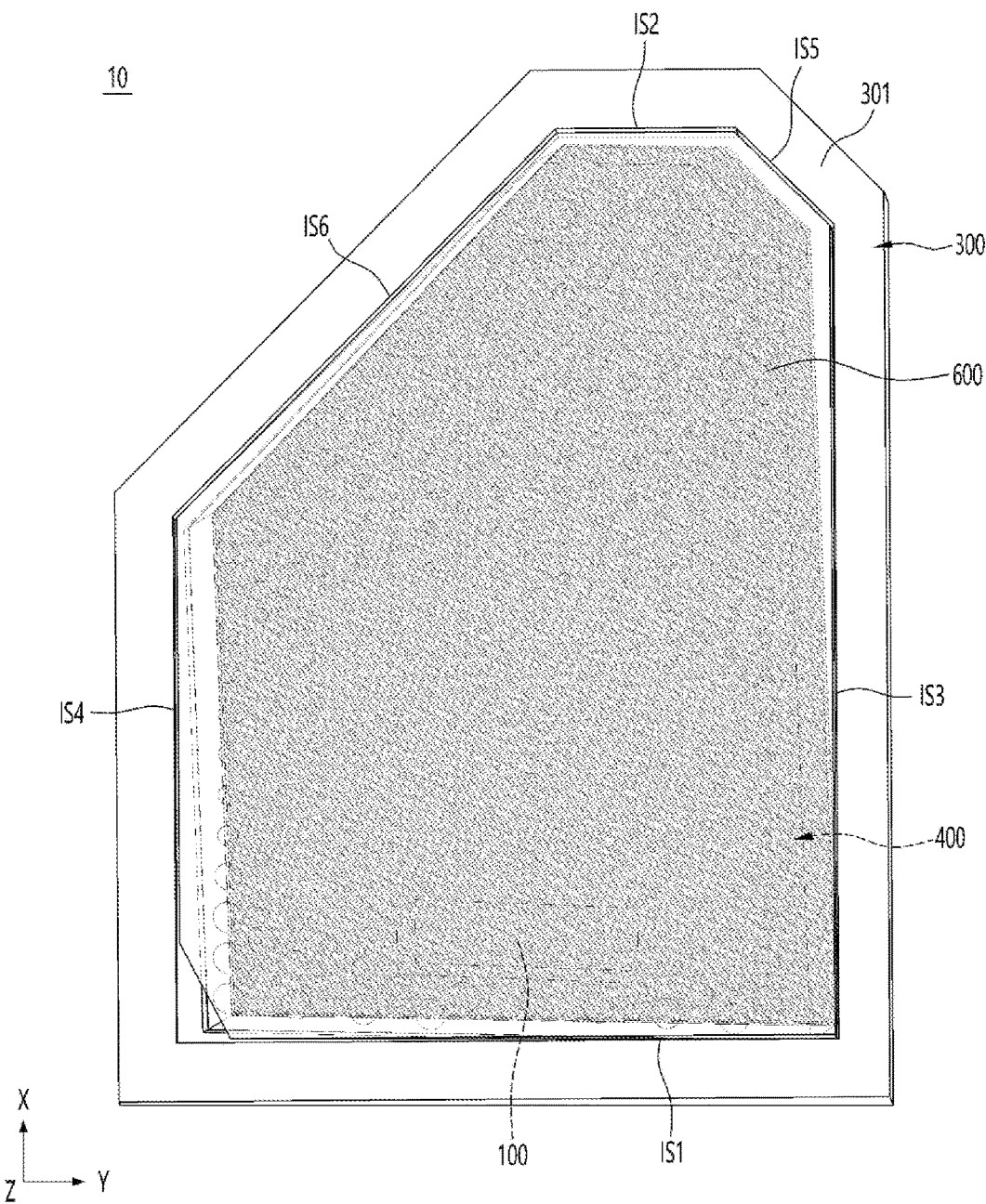
FIG. 2 is a top view of an optical assembly according to an embodiment.
Figure 3:
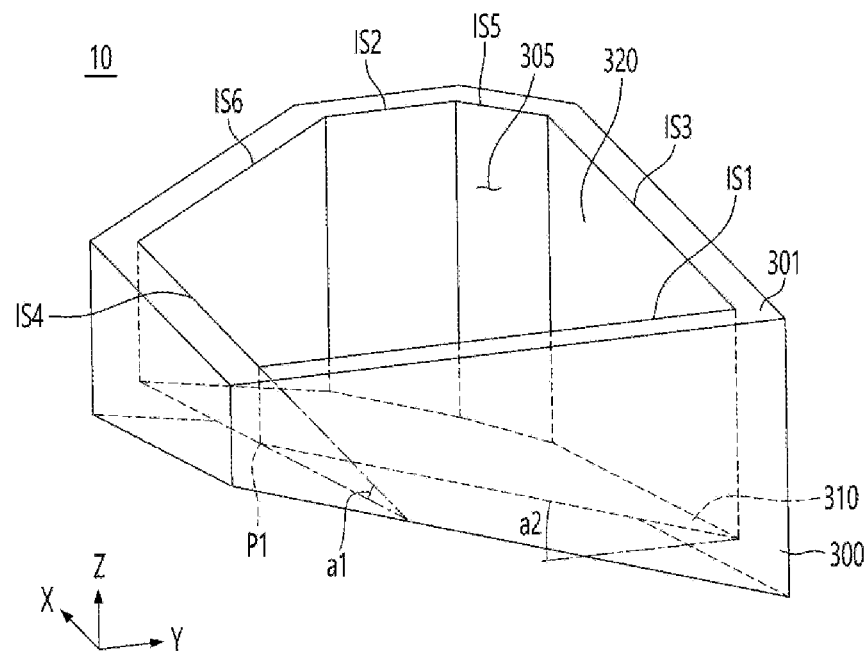
FIG. 3 is a side view of a housing according to an embodiment.
Figure 4:
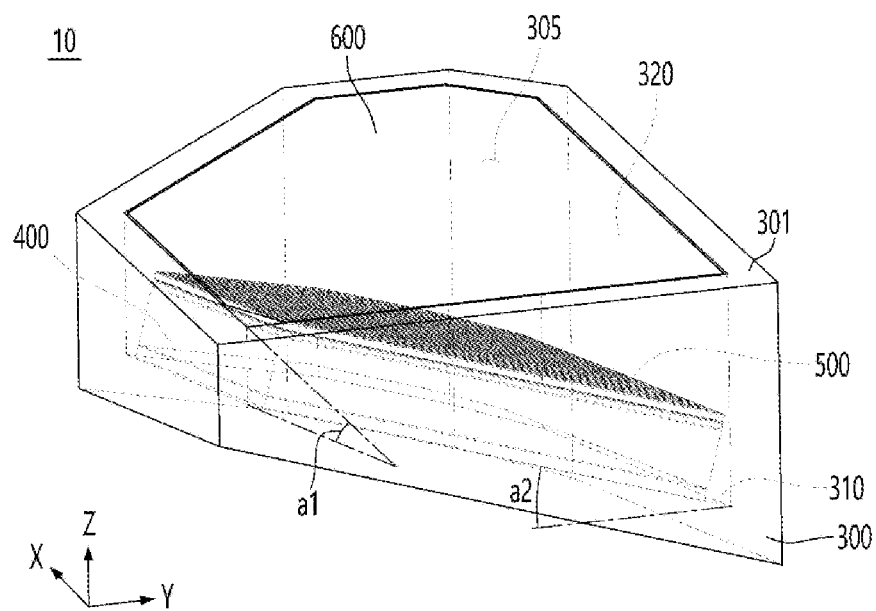
FIG. 4 is a side view of an optical assembly according to an embodiment.
Figure 5:
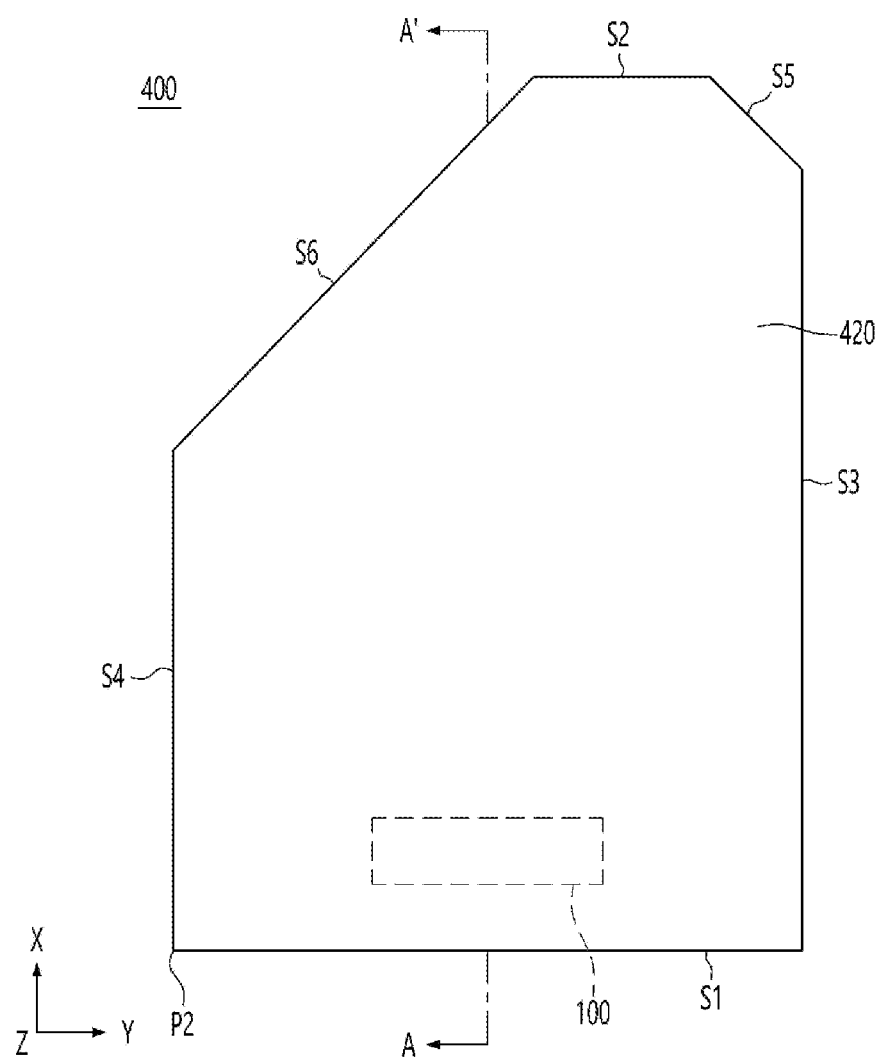
FIG. 5 is a top view of a lighting module according to an embodiment.

FIG. 1 is an exploded perspective view of an optical assembly according to an embodiment, and FIG. 2 is a top view of the optical assembly according to the embodiment. FIG. 3 is a side view of the housing according to the embodiment, and FIG. 4 is a side view of the optical assembly according to the embodiment. In addition, FIG. 5 is a top view of the lighting module according to the embodiment.

The optical assembly according to the embodiment may be applied to the left and right-side mirrors of the vehicle prior to a description of the drawing FIGS. 1 to 5, and may provide visual information to the driver of the vehicle.

An optical assembly applied to the left-side mirror adjacent to the driver's seat will be described with reference to FIGS. 1 to 5. Since the optical assembly applied to the right-side mirror adjacent to the passenger seat has the same shape and structure as the optical assembly applied to the driver's seat and is symmetrical to each other, for convenience of description, the optical assembly disposed on the driver's seat will be mainly described.

Referring to FIGS. 1 to 5, the optical assembly 10 according to the embodiment may include a housing 300, a lighting module 400, an optical member 500, and a cover member 600.

The housing 300 may include an opened one side and a receiving space 305 therein. The housing 300 may accommodate the lighting module 400, the optical member 500, and the cover member 600.

The housing 300 has a predetermined reliability and may include a material that is not damaged by heat and light emitted from the lighting module 400. For example, the housing 300 may include a resin material or a metal material. In detail, the housing 300 may include at least one material of plastic, polypropylene (PP), polyethylene (PE), polycarbonate (PC), Polybutylene Terephthalate (PBT), Acrylonitrile Butadiene Styrene copolymer (ABS), Poly Oxy Methylene (POM), Polyacetal polyphenylene oxide (PPO) resin and a modified PPO resin. In addition, the housing 300 may include at least one of silver (Ag), copper (Cu), titanium (Ti), magnesium (Mg), chromium (Cr), molybdenum (Mo), nickel (Ni), aluminum (Al), stainless steel and an alloy including the same. When the housing 300 includes a metal material, the housing 300 may provide a heat dissipation path for the lighting module 400. Accordingly, the heat dissipation characteristic of the optical assembly 10 may be improved.

The housing 300 may include a material capable of absorbing the light emitted from the lighting module 400. In addition, a surface of the receiving space 305 of the housing 300 may absorb the light emitted from the lighting module 400. In detail, the housing 300 or the surface material may have a light absorptivity of 50% or more and a light reflectance of 50% or less. For example, the housing 300 may be provided in a color capable of absorbing the light emitted from the lighting module 400. In detail, the material of the housing 300 or the surface of the receiving space 305 may include black. Accordingly, it is possible to prevent or minimize light emitted from the lighting module 400 from being reflected on the bottom surface 310 and the inner surface 320 of the housing 300. Accordingly, the light emitted from the lighting module 400 may be emitted in a set direction.

The housing 300 may include a bottom surface 310 and an inner surface 320 formed by the receiving space 305.

The bottom surface 310 of the housing 300 may have various shapes. In detail, the bottom surface 310 of the housing 300 may have various shapes, such as polygons, circles, and ellipses, when viewed in a plan view. For example, the bottom surface 310 of the housing 300 may have a polygonal shape, for example, a hexagonal shape as shown in FIG. 2.

The bottom surface 310 of the housing 300 may have an inclined shape. In detail, the bottom surface 310 of the housing 300 may be inclined in one direction with respect to the upper surface 301 of the housing 300.

The inner surface 320 of the housing 300 may include a plurality of inner surfaces. The inner surface 320 of the housing 300 may be perpendicular to the upper surface 301 of the housing 300. The inner surface 320 of the housing 300 may include a first inner surface IS1 and a second inner surface IS2 facing the first inner surface IS1. In addition, the inner surface 320 of the housing 300 may include a third inner surface IS3 and a fourth inner surface IS4 disposed between the first and second inner surfaces IS1 and IS2. In addition, the inner surface 320 of the housing 300 may include a fifth inner surface IS5 disposed between the second inner surface IS2 and the third inner surface IS3, and a sixth inner surface IS6 disposed between the second inner surface IS2 and the fourth inner surface IS4.

At this time, the height between the bottom surface 310 of the housing 300 and the upper surface 301 of the housing 300 may increase from the first inner surface IS1 toward the second inner surface IS2. In addition, the height between the bottom surface 310 of the housing 300 and the upper surface 301 of the housing 300 may decrease from the third inner surface IS3 toward the fourth inner surface IS4.

That is, based on the direction from the first inner surface IS1 toward the second inner surface IS2, the bottom surface 310 of the housing 300 may be inclined at a first inclination angle a1 with respect to the upper surface of the housing 300.

The first inclination angle a1 may be about 15 degrees to about 40 degrees. In detail, the first inclination angle a1 may be about 20 degrees to about 35 degrees. When the first inclination angle a1 does not satisfy the above-described range, the light emitted from the lighting module 400 disposed on the bottom surface 310 may be emitted in an unwanted direction. For example, when the first inclination angle a1 does not satisfy the above-described range, the luminance value of light emitted in the direction in which the user is located may be significantly low, and the luminance value of light emitted in an unwanted direction may be significantly higher. Preferably, the first inclination angle a1 may be about 25 degrees to about 30 degrees.

In addition, based on the direction from the third inner surface IS3 toward the fourth inner surface IS4, the bottom surface 310 of the housing 300 may be inclined at a second inclination angle a2 with respect to the upper surface of the housing 300.

The second inclination angle a2 may be about 15 degrees to about 40 degrees. In detail, the second inclination angle a2 may be about 20 degrees to about 35 degrees. When the second inclination angle a2 does not satisfy the above-described range, the light emitted from the lighting module 400 disposed on the bottom surface 310 may be emitted in an unwanted direction. For example, when the second inclination angle a2 does not satisfy the above-described range, the luminance value of light emitted in the direction in which the user is located may be significantly low, and the luminance value of light emitted in an unwanted direction may be significantly higher. Preferably, the second inclination angle a2 may be about 25 degrees to about 30 degrees.

The bottom surface 310 of the housing 300 may have a shape inclined in the above-described direction. In detail, the height between the bottom surface 310 of the housing 300 and the top surface of the housing 300 may have the lowest value in a first intersection point P1 defined by the intersection point of the first inner surface IS1 and the fourth inner surface IS4. In addition, the height between the bottom surface 310 of the housing 300 and the upper surface of the housing 300 may have the highest value in a region adjacent to the fifth inner surface IS5. That is, the bottom surface 310 of the housing 300 may have a shape inclined from the first intersection point P1 toward the fifth inner surface IS5.

The lighting module 400 may be disposed in the housing 300. The lighting module 400 is disposed in the receiving space 305, and may be disposed on the bottom surface 310 of the housing 300. The lighting module 400 may have a constant thickness and may emit light as a surface light source.

The lighting module 400 may be in direct contact with the bottom surface 310 of the housing 300. In addition, the lighting module 400 may indirectly contact the bottom surface 310 of the housing 300 by an adhesive member (not shown) or the like.

The lighting module 400 may have a shape corresponding to the bottom surface 310 of the housing 300. For example, the planar shape of the lighting module 400 may have a shape corresponding to the bottom surface 310. Accordingly, the lighting module 400 may be easily disposed in the receiving space 305.

The lighting module 400 may include a plurality of outer surfaces. For example, the lighting module 400 may include the first to sixth inner surfaces IS1 to IS6 and first to sixth side surfaces S1 to S6 corresponding to each. Each of the first to sixth side surfaces S1 to S6 may be a side surface facing the first to sixth inner surfaces IS1 to IS6, respectively.

The lighting module 400 may be inclinedly disposed on the bottom surface 310. For example, the lighting module 400 may be disposed to be inclined at an inclination angle corresponding to the inclined bottom surface 310 with respect to the upper surface 301 of the housing 300.

Accordingly, the height between the upper surface of the lighting module 400 and the upper surface 301 of the housing 300 may increase in a direction from the first side surface S1 to the second side surface S2. In addition, the height between the upper surface of the lighting module 400 and the upper surface 301 of the housing 300 may decrease in a direction from the third side surface S3 to the fourth side surface S4.

That is, based on the direction from the first side surface S1 toward the second side surface S2, the upper surface and/or the bottom surface of the lighting module 400 may be inclined at the first inclination angle a1 with respect to the upper surface of the housing 300. In addition, based on the direction from the third side surface S3 toward the fourth side surface S4, the upper surface and/or the bottom surface of the lighting module 400 may be inclined at the second inclination angle a2 with respect to the upper surface of the housing 300.

Accordingly, the lighting module 400 may be inclinedly disposed in the housing 300. At this time, the height between the upper surface of the lighting module 400 and the upper surface of the housing 300 may have the lowest value at the second intersection point P2 defined as the intersection point of the first side surface S1 and the fourth side surface S4. In addition, the height between the upper surface of the lighting module 400 and the upper surface of the housing 300 may have the highest value in a region adjacent to the fifth side surface S5. That is, the lighting module 400 may have a shape inclined in a direction from the second intersection point P2 to the fifth side surface S5.

The lighting module 400 includes at least one light emitting device 100 and may emit light as a surface light source. The lighting module 400 may emit light in a direction of an opened upper portion of the housing 300.

The light emitting device 100 may be disposed in a region having a relatively small height difference from the upper surface 301 of the housing 300 to emit light in a direction of a region having a relatively large height difference. For example, the light emitting device 100 may be disposed adjacent to the first side surface S1 and may emit light in the direction of the second side surface S2. In detail, a distance between the light emitting device 100 and the first side surface S1 may be less than or equal to about 20% of a distance between the light emitting device 100 and the second side surface S2. In addition, a distance between the light emitting device 100 and the third side surface S3 may correspond to a distance between the light emitting device 100 and the fourth side surface S4.

The optical member 500 may be disposed in the receiving space 305. The optical member 500 may be disposed on the lighting module 400. The optical member 500 may be disposed in direct or indirect contact with the upper surface of the lighting module 400.

The optical member 500 may have a shape corresponding to the lighting module 400. In detail, the lower surface of the optical member 500 may have a shape corresponding to the upper surface of the lighting module 400. Accordingly, the optical member 500 may be easily disposed in the receiving space 305, and may effectively control the light emitted from the lighting module 400.

The optical member 500 may be inclinedly disposed on the lighting module 400. In detail, the optical member 500 may be inclined at an inclination angle corresponding to the lighting module 400.

For example, the height between the upper surface of the optical member 500 and the upper surface 301 of the housing 300 may increase in a direction from the first inner surface IS1 to the second inner surface IS2. In addition, a height between the upper surface of the optical member 500 and the upper surface 301 of the housing 300 may decrease in a direction from the third inner surface IS3 to the fourth inner surface IS4.

That is, based on the direction from the first inner surface IS1 toward the second inner surface IS2, the upper surface of the optical member 500 may be inclined at the first inclination angle a1 with respect to the upper surface of the housing 300. In addition, based on the direction from the third inner surface IS3 toward the fourth inner surface IS4, the upper surface of the optical member 500 may be inclined at the second inclination angle a2 with respect to the upper surface of the housing 300. Accordingly, the optical member 500 may be inclinedly disposed in the housing 300 by the inclined bottom surface 310 and the lighting module 400. That is, the optical member 500 may have a shape inclined toward the fifth inner surface IS5 from the first intersection point P1 of the housing 300.

The optical member 500 may control the light emitted from the lighting module 400. For example, the optical member 500 may include a prism sheet including a linear prism extending in one direction. In detail, the optical member 500 may include a first optical member including a linear prism extending in one direction and a second optical member including a linear prism extending in the other direction. Here, the other direction may be a direction perpendicular to the one direction. The first and second optical members may focus light emitted from the lighting module 400 in different directions.

The cover member 600 may be disposed in the receiving space 305. The cover member 600 may be disposed on the optical member 500. The cover member 600 may be disposed in direct or indirect contact with the upper surface of the optical member 500.

The cover member 600 may have a shape corresponding to the receiving space 305. For example, the planar shape of the cover member 600 may have a planar shape corresponding to the bottom surface 310 of the housing 300. Accordingly, the cover member 600 may be easily disposed and fixed in the receiving space 305.

The upper surface of the cover member 600 may be provided as a flat plane. For example, the upper surface 301 of the housing 300 may be provided in a flat plane, and the upper surface of the cover member 600 may be disposed on the same plane as the upper surface 301 of the housing 300.

The cover member 600 may include an inclined surface. In detail, the lower surface of the cover member 600 facing the optical member 500 may include an inclined surface corresponding to the lighting module 400 and/or the optical member 500.

In detail, a thickness between the upper and lower surfaces of the cover member 600 may increase in a direction from the first inner surface IS1 to the second inner surface IS2. In addition, the thickness between the upper and lower surfaces of the cover member 600 may decrease in a direction from the third inner surface IS3 to the fourth inner surface IS4.

That is, based on the direction from the first inner surface IS1 toward the second inner surface IS2, the lower surface of the cover member 600 may be inclined at the first inclination angle a1 with respect to the upper surface of the lighting module 400. In addition, based on the direction from the third inner surface IS3 toward the fourth inner surface IS4, the lower surface of the cover member 600 may be inclined at the second inclination angle a2 with respect to the upper surface of the cover member 600. That is, the lower surface of the cover member 600 may be inclined in the direction of the fifth inner surface IS5 from the first intersection point P1 of the housing 300.

Accordingly, the cover member 600 may cover one surface of the opened housing 300. That is, the cover member 600 may be disposed on the lighting module 400 and the optical member 500 to cover the components 400 and 500. The light emitted from the lighting module 400 may be emitted in a direction of an opened upper portion of the housing 300 through the optical member 500 and the cover member 600.

Figure 6:
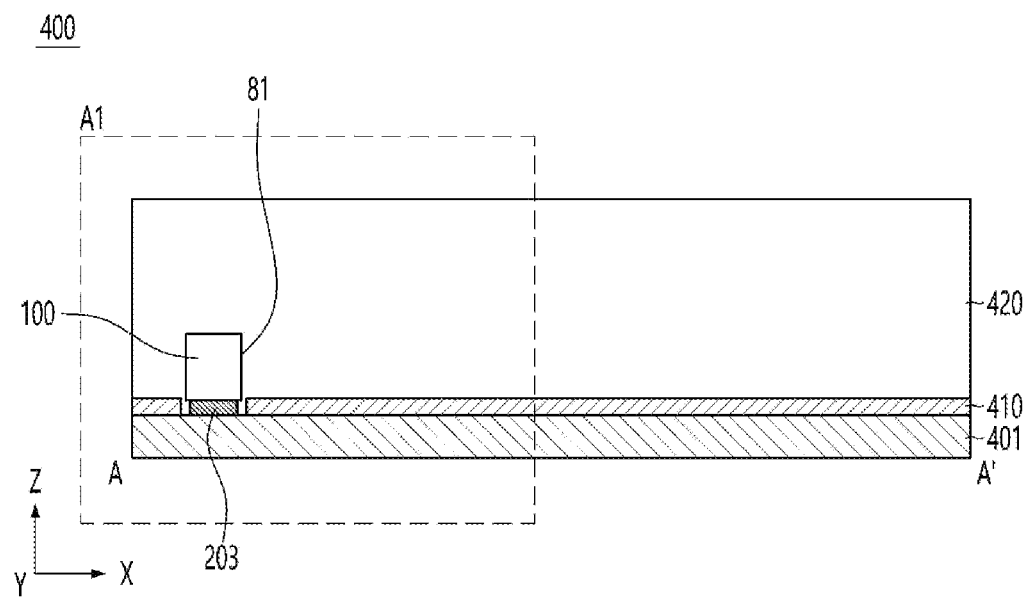
FIG. 6 is a cross-sectional view showing a cross-section taken along line A-A' of FIG. 5.
Figure 7:
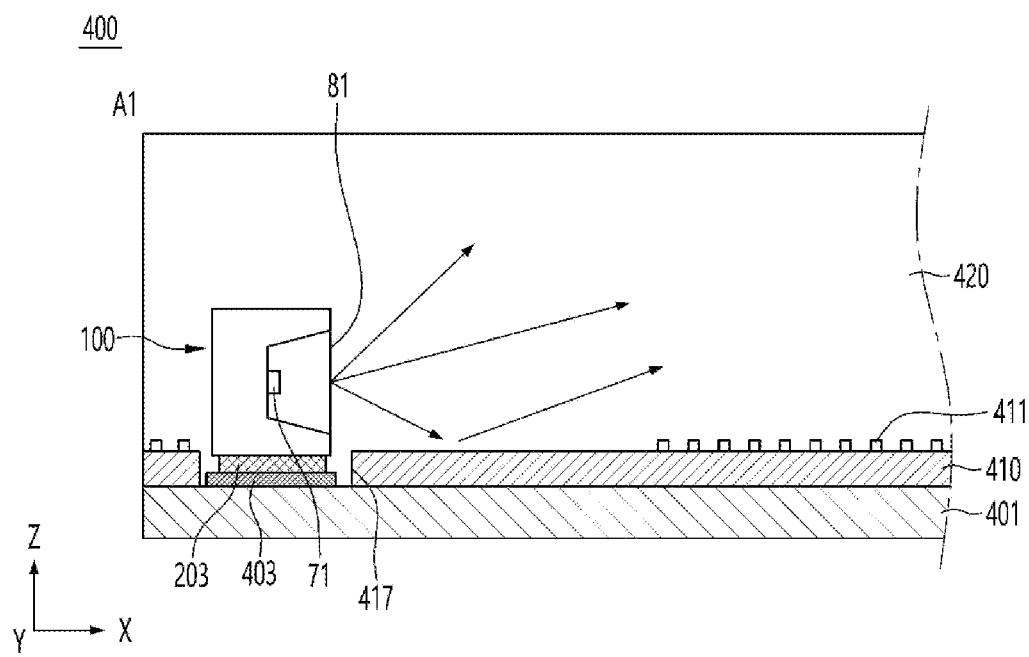
FIG. 7 is an enlarged view of an area A1 of FIG. 6.

FIG. 6 is a cross-sectional view illustrating a cross-section taken along line A-A' of FIG. 5, and FIG. 7 is an enlarged view of a region A1 of FIG. 6. The lighting module 400 according to the embodiment will be described in more detail with reference to FIGS. 6 and 7.

Referring to FIGS. 6 and 7, the lighting module 400 covers a substrate 401, the light emitting device 100 disposed on the substrate 401, and a resin layer 420 covering and sealing the substrate 401 and the light emitting device 100. In addition, the lighting module 400 may include a reflective member 410 disposed on the substrate 401.

The lighting module 400 may emit the light emitted from the light emitting device 100 as a surface light source. The lighting module 400 may be defined as a light emitting cell or a light source module. The lighting module 400 may include one light emitting cell or a plurality of light emitting cells on the substrate 401.

The substrate 401 may include a printed circuit board (PCB). The substrate 410 may include, for example, at least one of a resin-based printed circuit board (PCB), a metal core PCB, a flexible PCB, a ceramic PCB, and an FR-4 substrate. When the substrate 401 is disposed as a metal core PCB having a metal layer disposed on the bottom, the heat dissipation efficiency of the light emitting device 100 may be improved.

The substrate 401 may be electrically connected to the light emitting device 100. The substrate 401 may include a wiring layer (not shown) thereon, and the wiring layer may be electrically connected to the light emitting device 100. When a plurality of light emitting devices 100 are arranged on the substrate 401, the plurality of light emitting devices 100 may be connected in series, parallel, or series-parallel by the wiring layer. The substrate 401 may function as a base member or a support member disposed under the light emitting device 100 and the resin layer 420.

The upper surface of the substrate 401 may have an X-Y plane. The upper surface of the substrate 401 may be flat or have a curved surface. The thickness of the substrate 401 may be a height in the Z direction. Here, the X direction may be a first direction, and the Y direction may be a second direction. The Z direction may be a direction orthogonal to the first and second directions. A length of the substrate 401 in the first direction may be greater than a width in the second direction. The length of the substrate 401 in the first direction may be two times or more, for example, four times or more than the width in the second direction.

The substrate 401 may include a light-transmitting material through which light is transmitted through the upper and lower surfaces. The light-transmitting material may include at least one of polyethylene terephthalate (PET), polystyrene (PS), and polyimide (PI).

The light emitting device 100 is disposed on the substrate 401 and may emit light in a first direction. That is, the light emitting device 100 may emit light in the direction of the second side surface S2 of the lighting module 400.

The light emitting device 100 may have an emitting surface 81 through which light is emitted, and the emitting surface 81 may be disposed, for example, in a third direction or a vertical direction with respect to a horizontal upper surface of the substrate 401. The emission surface 81 may be a vertical plane, or may include a concave surface or a convex surface.

Figure 13:
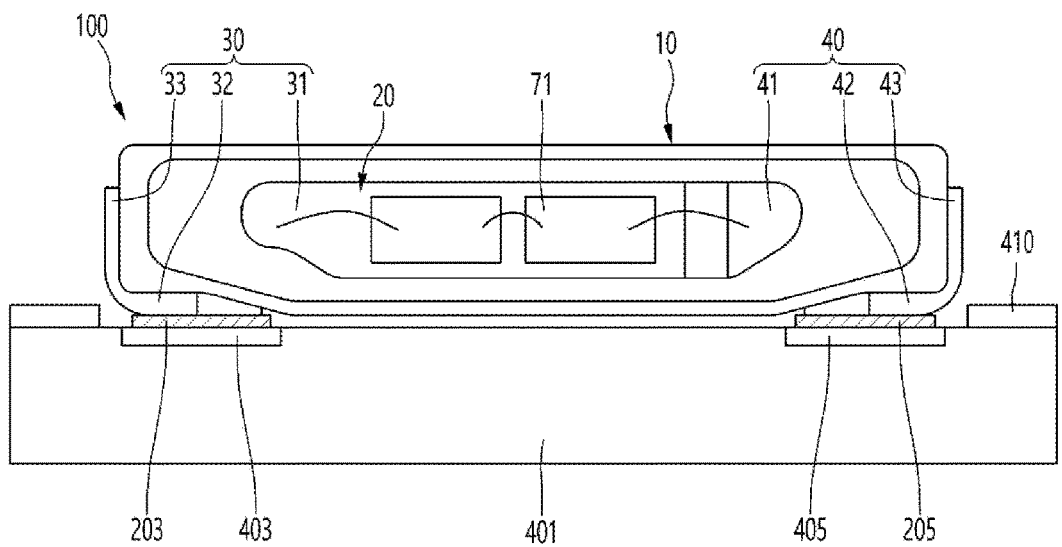
FIG. 13 is a front view showing a light emitting device on a substrate in the lighting module according to the embodiment.
Figure 14:
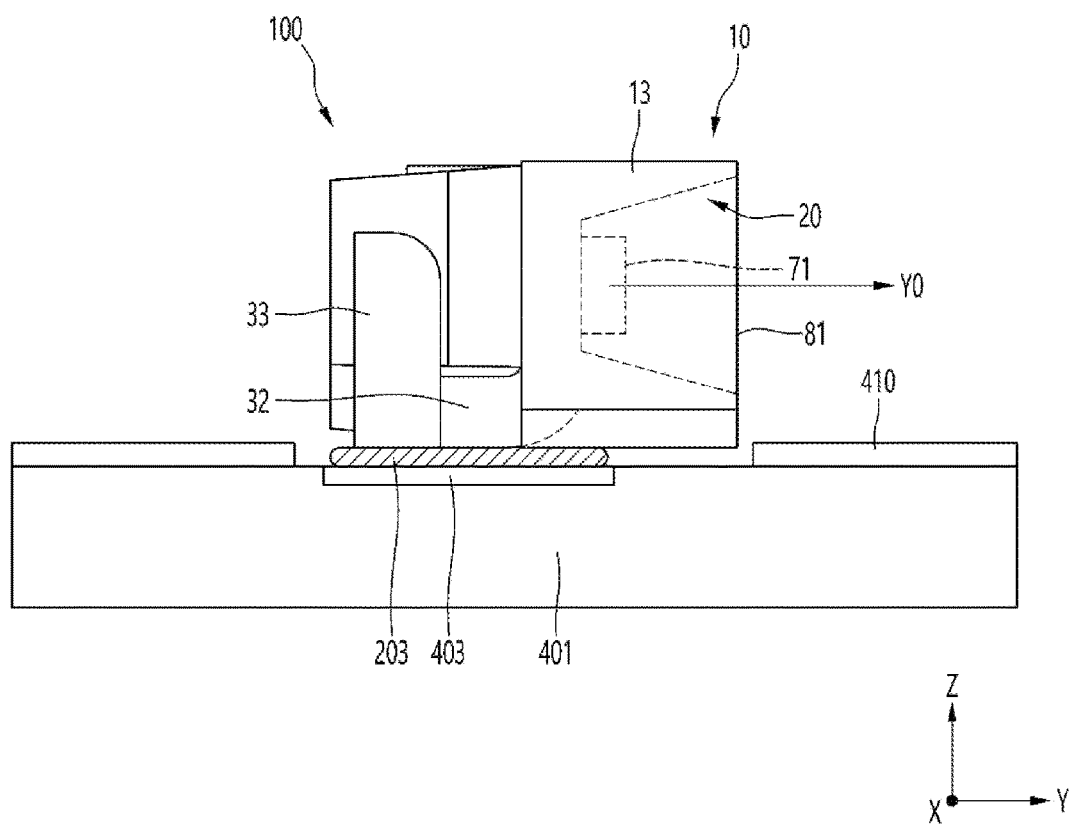
FIG. 14 is a side view of the light emitting device of FIG. 13.

As shown in FIGS. 13 and 14, the light emitting device 100 is disposed on, for example, the substrate 401 and may be electrically connected to the pads 403 and 405 of the substrate 401 by conductive bonding members 203 and 205. The conductive bonding members 203 and 205 may be made of a solder material or a metal material.

The light emitting device 100 may be disposed in a relatively upper region of the inclined bottom surface 310 of the housing 300. The light emitting device 100 may emit light in the first direction, for example, in a direction from a relatively inclined upper region to a lower region.

The optical axis of the light emitting device 100 may correspond to the bottom surface 310. In detail, the optical axis of the light emitting device 100 may be parallel to the bottom surface 310 of the housing 300, and may have the first inclination angle a1 with the upper surface of the housing 300.

One or a plurality of light emitting devices 100 may be disposed on the substrate 401. For example, as shown in the drawing, one light emitting device 100 emitting light in the first direction may be disposed on the substrate 401.

As another example, although not shown in the drawings, a plurality of light emitting devices 100 emitting light in the first direction on the substrate 401 may be arranged in at least one row or arranged in two or more rows in the second direction. In addition, the plurality of light emitting devices 100 may be arranged in at least one row or in two or more rows in the first direction. Also, the plurality of light emitting devices 100 may be disposed on the substrate 401 in different directions.

The light emitting device 100 is a device including a light emitting diode (LED), and may include a package in which a light emitting chip is packaged. The light emitting chip 71 may emit at least one of blue, red, green, ultraviolet (UV) and infrared light, and the light emitting device 100 may emit at least one of white, blue, red, green, and infrared light. The light emitting device 100 may be of a side view type in which a bottom portion is electrically connected to the substrate 401, but is not limited thereto. As another example, the light emitting device 100 may be an LED chip, but is not limited thereto.

The emission surface 81 of the light emitting device 100 may be disposed on at least one side of the light emitting device 100 rather than the upper surface. The emission surface 81 may be a surface adjacent to the substrate 401 among the side surfaces of the light emitting device 100, for example, a side surface adjacent to the upper surface of the substrate 401. The emission surface 81 is disposed on a side surface between the bottom surface and the upper surface of the light emitting device 100, and emits light of the highest intensity in the first direction. The emission surface 81 of the light emitting device 100 may be a surface adjacent to the reflective member 410 or a surface perpendicular to the upper surface of the substrate 401 and the upper surface of the reflective member 410.

The light emitted through the emission surface 81 of the light emitting device 100 may travel in a direction parallel to the upper surface of the substrate 401, may be reflected by the reflective member 410, or may be proceed in the upward direction of the resin layer 420. The thickness of the light emitting device 100 may be, for example, 3 mm or less, for example, in the range of 0.8 mm to 2 mm. The length of the light emitting device 100 in the second direction may be 1.5 times or more of the thickness of the light emitting device 100, but is not limited thereto. The light emitting device 100 may have a wider light beam angle in the ±Y direction than the light beam angle in the Z direction. The light beam angle of the light emitting device 100 in the second direction may be 110 degrees or more, for example, 120 degrees to 160 degrees or 140 degrees or more. The light beam angle in the third direction of the light emitting device 100 may be 110 degrees or more, for example, 120 degrees to 140 degrees.

The reflective member 410 may be disposed between the substrate 401 and the resin layer 420. The reflective member 410 may be provided in the form of a film having a metal material or a non-metal material. The reflective member 410 may be adhered to the upper surface of the substrate 401. The reflective member 410 may have an area smaller than an area of a upper surface of the substrate 401. The reflective member 410 may be spaced apart from the edge of the substrate 401, and a resin layer 420 may be attached to the substrate 401 in the spaced region. In this case, it is possible to prevent the edge portion of the reflective member 410 from peeling off.

The reflective member 410 may include an opening 417 in which a lower portion of the light emitting device 100 is disposed. The upper surface of the substrate 401 may be exposed in the opening 417 of the reflective member 410 and a portion to which the lower portion of the light emitting device 100 is bonded may be disposed. The size of the opening 417 may be the same as or larger than the size of the light emitting device 100, but is not limited thereto. The reflective member 410 may contact the upper surface of the substrate 401 or may be adhered between the resin layer 420 and the substrate 401, but is not limited thereto. Here, the reflective member 410 may be removed when a highly reflective material is coated on the upper surface of the substrate 401.

The reflective member 410 may be formed to have a thickness smaller than that of the light emitting device 100. The thickness of the reflective member 410 may include a range of 0.2 mm±0.02 mm. A lower portion of the light emitting device 100 may penetrate through the opening 417 of the reflective member 410 and an upper portion of the light emitting device 100 may protrude. The emission surface 81 of the light emitting device 100 may be provided in a direction perpendicular to the upper surface of the reflective member 410.

The reflective member 410 may include a metallic material or a non-metallic material. The metallic material may include a metal such as aluminum, silver, or gold. The non-metallic material may include a plastic material or a resin material. The plastic material may be any one selected from the group consisting of polyethylene, polypropylene, polystyrene, polyvinyl chloride, polybiphenyl chloride, polyethylene terephthalate, polyvinyl alcohol, polycarbonate, polybutylene terephthalate, polyethylene naphthalate, polyamide, polyacetal, polyphenylene ether, polyamideimide, polyetherimide, polyetheretherketone, polyimide, polytetrafluoroethylene, liquid crystal polymer, fluororesin, copolymers thereof, and mixtures thereof. As the resin material, a reflective material, for example, a metal oxide such as $TiO_2$, $Al_2O_3$, or $SiO_2$ may be added in silicon or epoxy. The reflective member 410 may be implemented as a single layer or a multilayer, and light reflection efficiency may be improved by such a layer structure. The reflective member 410 according to an embodiment of the invention reflects incident light, thereby increasing the amount of light so that the light is uniformly distributed.

Also, referring to FIG. 7, the reflective member 410 may include an adhesive layer (not shown), a reflective layer (not shown), and a plurality of dots 411. The adhesive layer may attach the reflective member 410 to the upper surface of the substrate 401. The adhesive layer is a transparent material, and may be an adhesive such as UV adhesive, silicone, or epoxy.

The reflective layer may include a plurality of reflective agents (not shown) inside the resin material. The reflective agents may be a bubble, such as air, or a medium having the same refractive index as that of air. The resin material of the reflective layer may be a material such as silicone or epoxy, and the reflective agent may be formed by injecting air bubbles into the resin material. The reflective layer may reflect the light incident by the plurality of r reflective agents or refract it in a different direction. The thickness of the reflective layer may be 80% or more of the thickness of the reflective member 410.

The plurality of dots 411 may be disposed to protrude on the upper surface of the reflective member 410. For example, the plurality of dots 411 may be disposed on the upper surface of the reflective layer in a shape protruding from the upper surface. The plurality of dots 411 may be spaced apart from the light emitting device 100. The plurality of dots 411 may be spaced apart from the light emitting device 100 in a first direction and a second direction. The plurality of dots 411 may be formed on the reflective layer by printing. The plurality of dots 411 may include reflective ink. The plurality of dots 411 may be printed using a material including any one of $TiO_2$, $CaCO_3$, $BaSO_4$, $Al_2O_3$, Silicon, and PS. Each of the plurality of dots 411 may have a hemispherical side cross-section or a polygonal shape. The material of the dot 411 may be white.

The density of the dot pattern of the plurality of dots 411 may increase as the distance from the emission surface 81 of the light emitting device 100 increases. In addition, the sizes of the plurality of dots 411 may change as they move away from the emission surface 81 of the light emitting device 100. For example, the width of the plurality of dots 411 may increase as the distance from the emission surface 81 of the light emitting device 100 increases.

Since the plurality of dots are disposed on the upper surface of the reflective member 410 in the emission direction of the light emitting device 100, light reflectance may be improved, light loss may be reduced, and the luminance of the surface light source may be improved.

The resin layer 420 may be disposed on the substrate 401. The resin layer 420 may face the substrate 401. The resin layer 420 may be disposed on all or a portion of the upper surface of the substrate 401. The area of the lower surface of the resin layer 420 may be the same as or smaller than the area of the upper surface of the substrate 401. The resin layer 420 may be formed of a transparent material. The resin layer 420 may include a resin material such as silicone or epoxy. The resin layer 420 may include a thermosetting resin material, for example, may selectively include PC, OPS, PMMA, PVC, and the like. The resin layer 420 may be formed of glass, but is not limited thereto. For example, the main material of the resin layer 420 may be a resin material having a urethane acrylate oligomer as a main material. For example, a mixture of urethane acrylate oligomer, which is a synthetic oligomer, and a polymer type, which is polyacrylic, may be used. Of course, the main material may further include a monomer mixed with low-boiling dilution-type reactive monomers such as IBOA (isobornyl acrylate), HPA (hydroxyl propyl acrylate), 2-HEA (2-hydroxyethyl acrylate), etc., as an additive, a photo initiator (for example, 1-hydroxycyclohexyl phenyl-ketone, etc.) or antioxidants may be mixed.

Since the resin layer 420 is provided as a layer for guiding light as a resin, it may be provided with a thinner thickness than in the case of glass and may be provided as a flexible plate. The resin layer 420 may emit the point light source emitted from the light emitting device 100 in the form of a line light source or a surface light source.

The upper surface of the resin layer 420 may emit light by diffusing the light emitted from the light emitting device 100. For example, beads (not shown) may be included in the resin layer 420, and the beads may diffuse and reflect incident light to increase the amount of light. The beads may be disposed in an amount of 0.01 to 0.3% based on the weight of the resin layer 420. The bead may be composed of any one selected from silicon, silica, glass bubble, polymethyl methacrylate (PMMA), urethane, Zn, Zr, $Al_2O_3$, and acryl., the particle diameter of the beads may be in the range of about 1 μm to about 20 μm, but is not limited thereto.

Since the resin layer 420 is disposed on the light emitting device 100, it is possible to protect the light emitting device 100 and reduce loss of light emitted from the light emitting device 100. The light emitting device 100 may be buried under the resin layer 420.

The resin layer 420 may be in contact with the surface of the light emitting device 100 and may be in contact with the emission surface 81 of the light emitting device 100. A portion of the resin layer 420 may be disposed in the opening 417 of the reflective member 410. A portion of the resin layer 420 may be in contact with the upper surface of the substrate 401 through the opening 417 of the reflective member 410. Accordingly, a portion of the resin layer 420 comes into contact with the substrate 401, thereby fixing the reflective member 410 between the resin layer 420 and the substrate 401.

Figure 8:
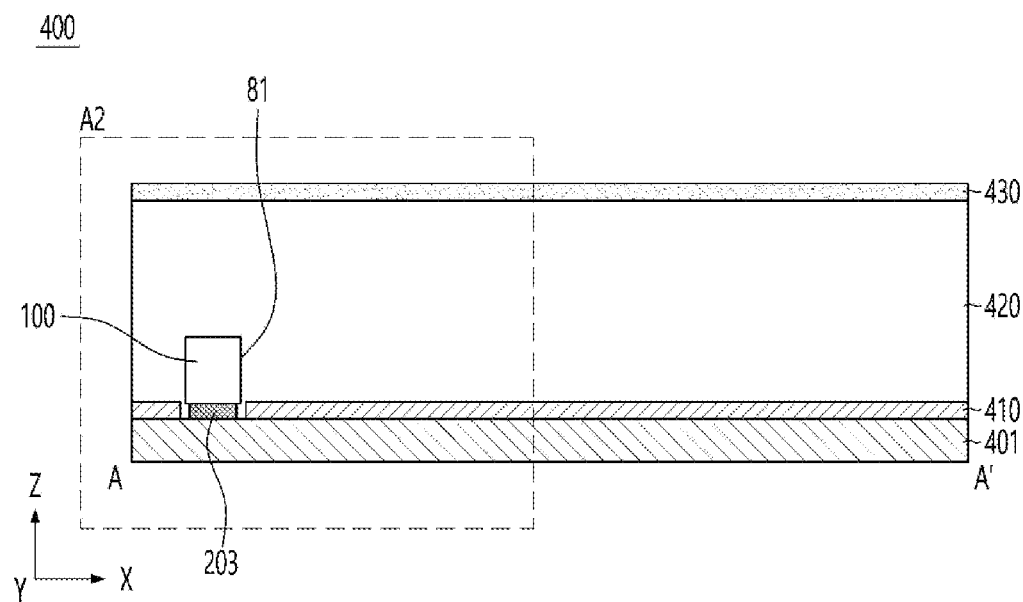
FIG. 8 is another cross-sectional view showing a cross-section taken along line A-A' of FIG. 5.
Figure 9:
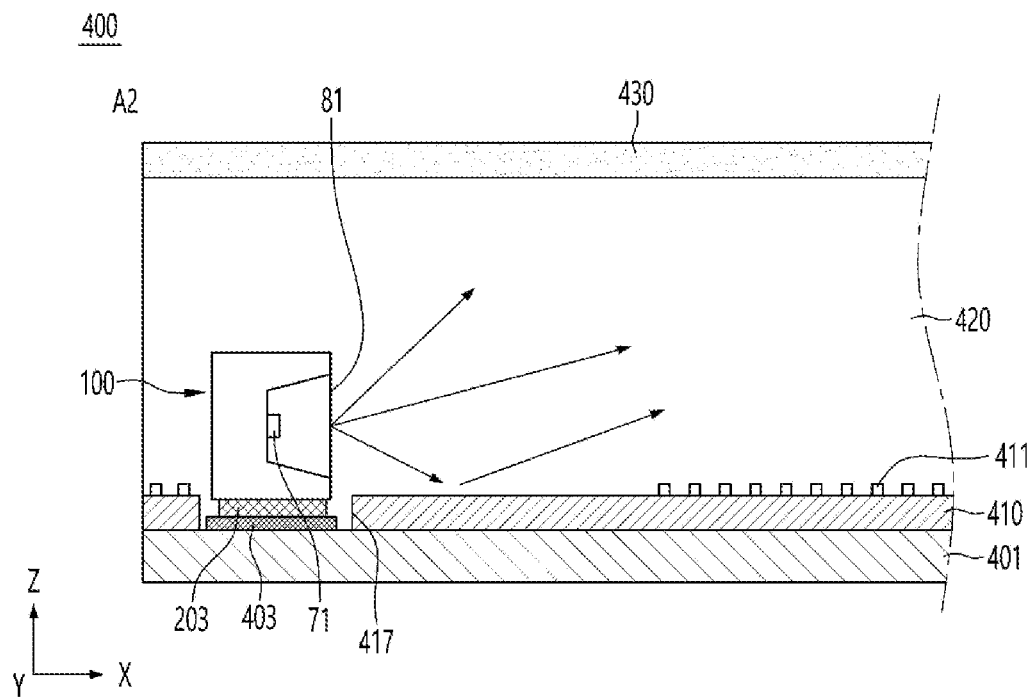
FIG. 9 is an enlarged view of a region A2 of FIG. 8.

FIG. 8 is another cross-sectional view showing a cross-section taken along line A-A' of FIG. 5, and FIG. 9 is an enlarged view of a region A2 of FIG. 8. In the description using FIGS. 8 and 9, descriptions of the same and similar components as those of the lighting module described above are omitted, and the same reference numerals are assigned to the same and similar components.

Referring to FIGS. 8 and 9, a diffusion layer 430 may be further disposed on the upper surface of the resin layer 420. For example, the upper surface of the resin layer 420 may have an adhesive force, and the diffusion layer 430 may be adhered to the resin layer 420. For example, the upper surface of the resin layer 420 may be adhered to the diffusion layer 430 by an adhesive force having fine cilia. At this time, the diffusion layer 430 may be attached to the resin layer 420 by applying a predetermined pressure or pressure/heat. Since the diffusion layer 430 is adhered to the resin layer 420 by self-adhesive force without a separate adhesive, it is possible to reduce the process of separately attaching the adhesive, and it is possible to avoid using an adhesive harmful to the human body, thereby reducing process or material waste.

The material of the diffusion layer 430 may be a light-transmitting material. The diffusion layer 430 may include at least one of a polyester (PET) film, a poly methyl methacrylate (PMMA) material, or a polycarbonate (PC). The diffusion layer 430 may be provided as a film made of a resin material such as silicone or epoxy. The diffusion layer 430 may include a single layer or multiple layers.

The diffusion layer 430 may diffuse the light emitted through the resin layer 420. In addition, since a specific color may not be mixed when the luminous intensity of light is high, the diffusion layer 430 may diffuse and mix the lights.

The thickness of the diffusion layer 430 may be about 25 μm or more. For example, the thickness of the diffusion layer 430 may be about 25 μm to about 250 μm. In detail, the thickness of the diffusion layer 430 may be about 100 μm to about 250 μm. The diffusion layer 430 may have the above-described thickness range and may provide incident light as a uniform surface light source.

The diffusion layer 430 may include at least one or two or more of a diffusion agent such as beads, a phosphor, and ink particles. The phosphor may include, for example, at least one of a red phosphor, an amber phosphor, a yellow phosphor, a green phosphor, and a white phosphor. The ink particles may include at least one of metal ink, UV ink, and curing ink. The size of the ink particles may be smaller than the size of the phosphor. The surface color of the ink particles may be any one of green, red, yellow, and blue. The ink types may be selectively applied among PVC (Poly vinyl chloride) ink, PC (Polycarbonate) ink, ABS (acrylonitrile butadiene styrene copolymer) ink, UV resin ink, epoxy ink, silicone ink, PP (polypropylene) ink, water-based ink, plastic ink, PMMA (poly methyl methacrylate) ink and PS (Polystyrene) ink. The ink particles may include at least one of metal ink, UV ink, and curing ink.

Figure 10:
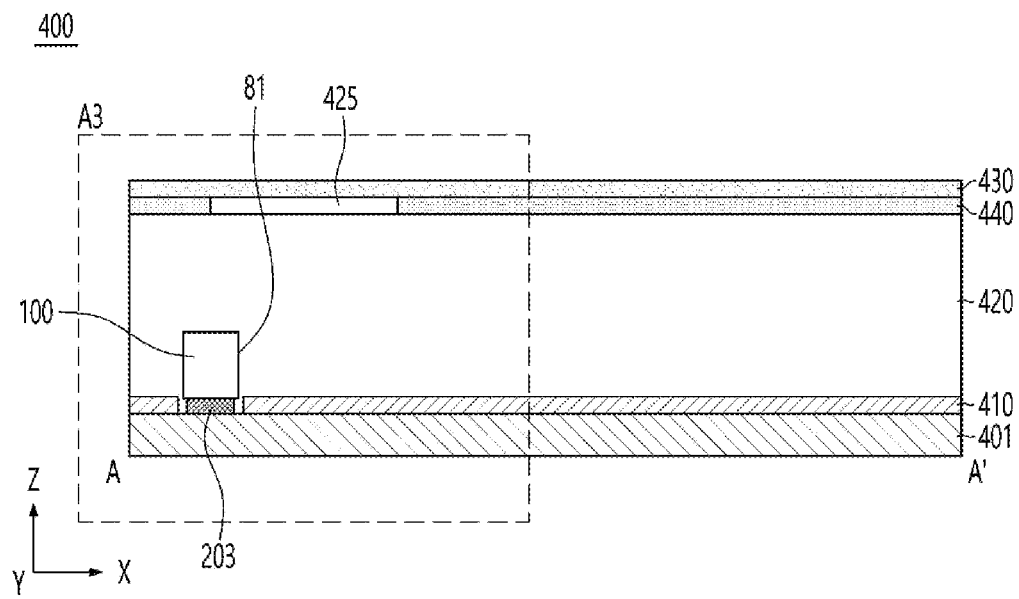
FIG. 10 is another cross-sectional view showing a cross-section taken along line A-A' of FIG. 5.
Figure 11:
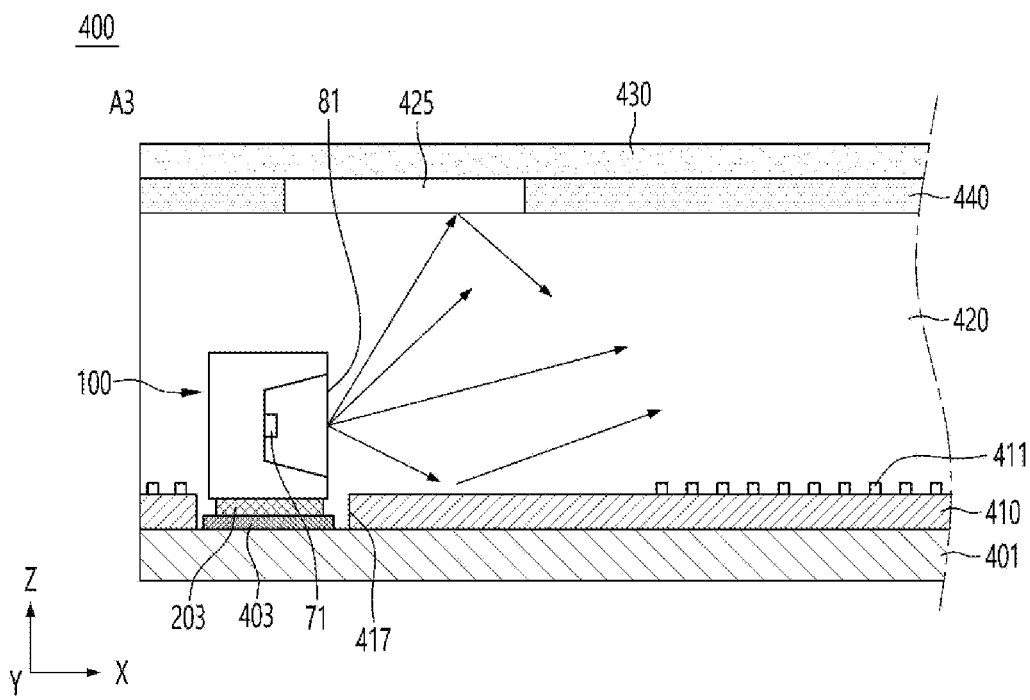
FIG. 11 is an enlarged view of a region A3 of FIG. 10.

FIG. 10 is another cross-sectional view showing a cross-section taken along line A-A' of FIG. 5, and FIG. 11 is an enlarged view of a region A3 of FIG. 10. In the description using FIGS. 10 and 11, descriptions of the same and similar components as those of the above-described lighting module are omitted, and the same reference numerals are assigned to the same and similar components.

Referring to FIGS. 10 and 11, a light blocking portion 425 may be further disposed on the resin layer 420. The light blocking portion 425 may face the upper surface of the substrate 401. The light blocking portion 425 may be disposed between the resin layer 420 and the diffusion layer 430. The light blocking portion 425 may overlap the light emitting device 100 in a third direction defined in the z-axis direction. The light blocking portion 425 may be printed by overlapping a plurality of layers on the lower surface of the diffusion layer 430, and the light blocking portion 425 may have a structure including a plurality of patterns having different sizes.

In addition, the light blocking portion 425 may be disposed to extend along an emission direction of the light emitted from the light emitting device 100. For example, the light blocking portion 425 may be disposed to extend to a region in which the plurality of dots 411 are disposed. In this case, the light blocking portion 425 may not overlap the plurality of dots 411 in the third direction. That is, the light blocking portion 425 may partially overlap the light emitting device 100 and be formed in a region that does not overlap the plurality of dots 411. Alternatively, the light blocking portion 425 may be disposed in a region where a part overlaps the light emitting device 100 and the other part overlaps the plurality of dots 411. In this case, an area of the light blocking portion 425 overlapping the plurality of dots 411 may be less than or equal to about 30% of an area of the light blocking portion 425 not overlapping the plurality of dots 411.

A width of the light blocking portion 425 in the first direction may be greater than a width of the light emitting device 100 in the first direction. Also, a width of the light blocking portion 425 in the second direction may be greater than a width of the light emitting device 100 in the second direction.

When viewed from the top, the planar shape of the light blocking portion 425 may have various shapes, such as a circular shape, an elliptical shape, and a polygonal shape. For example, the planar shape of the light blocking portion 425 may include a shape including a curve in consideration of the light beam angle of the light emitting device 100.

The number of the light blocking portions 425 may be the same as the number of the light emitting devices 100. The light blocking portion 425 may be provided with a size or area sufficient to prevent a hot spot caused by the light emitted in the exit direction of the light emitting device 100 on each of the light emitting devices 100. In addition, since the light emitting device 100 emits light in the side direction, that is, in the first direction, the light blocking portion 425 covers a region in which the light blocking efficiency by the light beam distribution and reflection characteristics of the light emitting device 100 may be increased.

An adhesive layer 440 may be disposed around the light blocking portion 425. The adhesive layer 440 may be disposed between the resin layer 420 and the diffusion layer 430. The adhesive layer 440 may be disposed on the upper surface of the resin layer 420 in a region where the light blocking portion 425 is not disposed. The adhesive layer 440 may include a light-transmitting adhesive material. The adhesive layer 440 may adhere the resin layer 420 and the diffusion layer 430 to each other.

Figure 12:
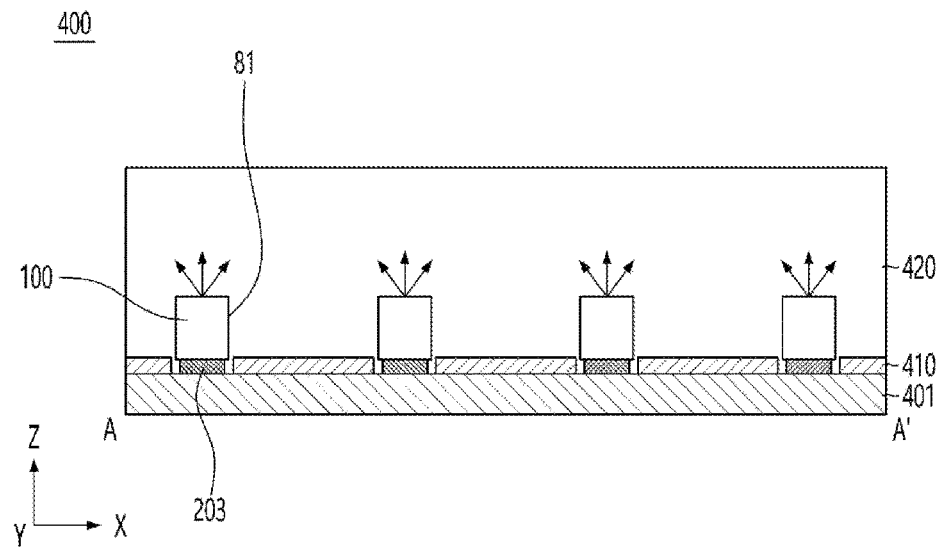
FIG. 12 is another cross-sectional view showing a cross-section taken along line A-A' of FIG. 5.

FIG. 12 is another cross-sectional view showing a cross-section taken along line A-A' of FIG. 5. In the description using FIG. 12, descriptions of the same and similar components as those of the lighting module described above are omitted, and the same reference numerals are assigned to the same and similar components.

Referring to FIG. 12, a plurality of light emitting devices 100 may be disposed on the substrate 401. The plurality of light emitting devices 100 may be of a top view type electrically connected to the substrate 401. The plurality of light emitting devices 100 may be disposed on the substrate 401 at set intervals. For example, the plurality of light emitting devices 100 may be disposed at equal intervals in the first direction. Also, the plurality of light emitting devices 100 may be disposed at equal intervals in the second direction.

Accordingly, the lighting module 400 including the plurality of light emitting devices 100 may emit light as a surface light source. The lighting module 400 may emit light in a direction of an opened upper portion of the housing 300.

FIG. 13 is a front view illustrating a light emitting device on a substrate in a lighting module according to an embodiment, and FIG. 14 is a side view of the light emitting device of FIG. 13.

Referring to FIGS. 13 and 14, the light emitting device 100 includes a body 10 having a cavity 20, a plurality of lead frames 30 and 40 in the cavity 20, and a light emitting chip 71 disposed on at least one of a plurality of lead frames 30 and 40. The light emitting device 100 may be implemented as a side view type package.

The body 10 may include a cavity 20 in which the lead frames 30 and 40 are exposed at the bottom. The plurality of lead frames 30 and 40 are separated into, for example, a first lead frame 30 and a second lead frame 40 and coupled to the body 10.

The body 10 may be formed of an insulating material. The body 10 may be formed of a reflective material. The body 10 may be formed of a material having a reflectance higher than a transmittance for a wavelength emitted from the light emitting chip, for example, a material having a reflectance of 70% or more. When the reflectivity is 70% or more, the body 10 may be defined as a non-transmissive material or a reflective material. The body 10 may be formed of a resin-based insulating material, for example, a resin material such as polyphthalamide (PPA). The body 10 may be formed of a silicone-based, epoxy-based, or thermosetting resin including a plastic material, or a high heat and light resistance material. The body 10 includes a white-based resin. An acid anhydride, an antioxidant, a mold release material, a light reflector, an inorganic filler, a curing catalyst, a light stabilizer, a lubricant, and titanium dioxide may be selectively added in the body 10. The body 10 may be molded by at least one selected from the group consisting of an epoxy resin, a modified epoxy resin, a silicone resin, a modified silicone resin, an acrylic resin, and a urethane resin. For example, an epoxy resin composition which is formed by adding an epoxy resin composed of triglycidyl isocyanurate, hydrogenated bisphenol A diglycidyl ether, etc. and an acid anhydride composed of hexahydrophthalic anhydride, 3-methylhexahydrophthalic anhydride, 4-methylhexahydrophthalic anhydride, etc. with 1,8-diazabicyclo (5,4,0) undecene-7 (DBU) as a curing agent, ethylene glycol as a co-catalyst, titanium oxide pigment, and glass fiber in the epoxy resin, partially curing by heating, and a solid epoxy resin composition obtained by curing and forming B staging may be used, and the present invention is not limited thereto. The body 10 may be suitably mixed with at least one selected from the group consisting of a diffusing agent, a pigment, a fluorescent material, a reflective material, a light-blocking material, a light stabilizer, and a lubricant.

The body 10 may include a reflective material, for example, a resin material to which a metal oxide is added, and the metal oxide may include at least one of TiO2, SiO2, and Al2O3. This body 10 may effectively reflect incident light. As another example, the body 10 may be formed of a light-transmitting resin material or a resin material having a phosphor that converts the wavelength of incident light. The bottom of the body 10 may be a side surface corresponding to the substrate 401.

The first lead frame 30 includes a first lead portion 31 disposed on the bottom of the cavity 20, a first bonding portion 32 and a first heat dissipating portion 33 extending outside the body 10. The first bonding portion 32 is bent from the first lead portion 31 in the body 10 and protrudes outside the body, and the first heat dissipating portion 33 may be bent from the first bonding portion 32.

The second lead frame 40 includes a second lead portion 41 disposed at the bottom of the cavity 20, a second bonding portion 42 and a second heat dissipating portion 43 disposed outside the body 10. The second bonding portion 42 may be bent from the second lead part 41 in the body 10, and the second heat dissipating portion 43 may be bent from the second bonding portion 42.

Here, the light emitting chip 71 may be disposed on the first lead portion 31 of the first lead frame 30, for example, and connected to the first and second lead portions 31 and 41 by wire, or may be connected with the first lead portion 31 and may be connected to the second lead portion 41 by a wire. The light emitting chip 71 may be a horizontal type chip, a vertical type chip, or a chip having a via structure. The light emitting chip 71 may be mounted in a flip chip manner. The light emitting chip 71 may selectively emit light within a wavelength range of ultraviolet to visible light. The light emitting chip 71 may emit light with an ultraviolet or blue peak wavelength, for example. The light emitting chip 71 may include at least one of a group II-VI compounds and a group III-V compounds. The light emitting chip 71 may be formed of, for example, a compound selected from the group consisting of GaN, AlGaN, InGaN, AlInGaN, GaP, AlN, GaAs, AlGaAs, InP, and mixtures thereof.

One or a plurality of light emitting chips 71 may be disposed in the cavity 20 and emit light with the greatest intensity in the direction of the central axis Y0.

One or a plurality of light emitting chips disposed in the cavity 20 of the light emitting device 100 according to the embodiment may be disposed. The light emitting chip may be selected from, for example, a red LED chip, a blue LED chip, a green LED chip, and a yellow green LED chip.

A molding member 80 is disposed in the cavity 20 of the body 11, and the molding member 80 includes a light-transmitting resin such as silicone or epoxy, and may be formed in a single layer or multiple layers. A phosphor for changing a wavelength of light emitted from the molding member 80 or the light emitting chip 71 may be included, and the phosphor excites a part of light emitted from the light emitting chip 71 and is emitted as light to have a different wavelength. The phosphor may be selectively formed from quantum dots, YAG, TAG, Silicate, Nitride, and Oxy-nitride-based materials. The phosphor may include at least one of a red phosphor, a yellow phosphor, and a green phosphor, but is not limited thereto. The emission surface 81 of the molding member 80 may be formed in a flat shape, a concave shape, a convex shape, and the like, but is not limited thereto. As another example, a light-transmitting film having a phosphor may be disposed on the cavity 20, but the embodiment is not limited thereto.

A lens may be further formed on the upper portion of the body 10, and the lens may include a structure of a concave and/or convex lens, and may adjust the light distribution of the light emitted by the light emitting device 100.

A semiconductor device such as a light receiving device and a protection device may be mounted on the body 10 or any one lead frame, and the protection device may be implemented as a thyristor, a Zener diode, or a TVS (transient voltage suppression). The Zener diode protects the light emitting chip from electro static discharge (ESD).

At least one or a plurality of light emitting devices 100 are disposed on the substrate 401, and a reflective member 410 is disposed around a lower portion of the light emitting device 100. The first and second lead portions 33 and 43 of the light emitting device 100 are bonded to the pads 403 and 405 of the substrate 401 with solder or conductive tape as conductive adhesive members 203 and 205.

The optical assembly 10 according to the embodiment may be used as a rear-view mirror assembly of a vehicle. For example, the optical assembly 10 may be disposed on the left and right-side mirrors of the vehicle to provide vehicle information located on the rear side to the driver.

Figure 15:
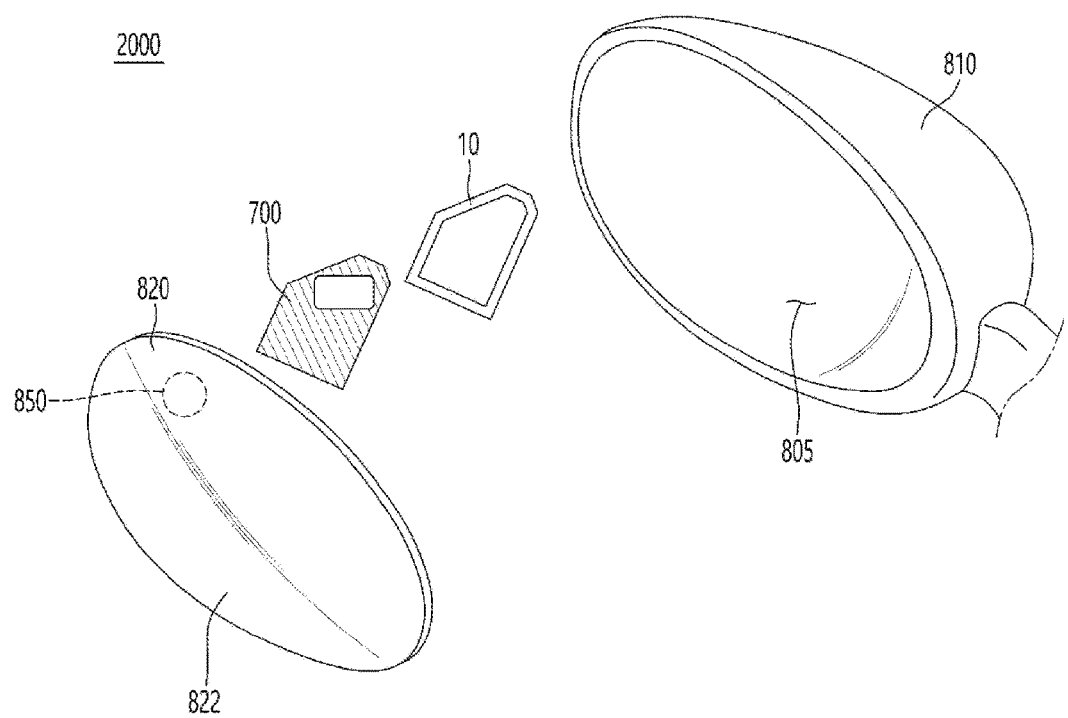
FIG. 15 is an exploded perspective view of a rear-view mirror assembly according to an embodiment.
Figure 16:
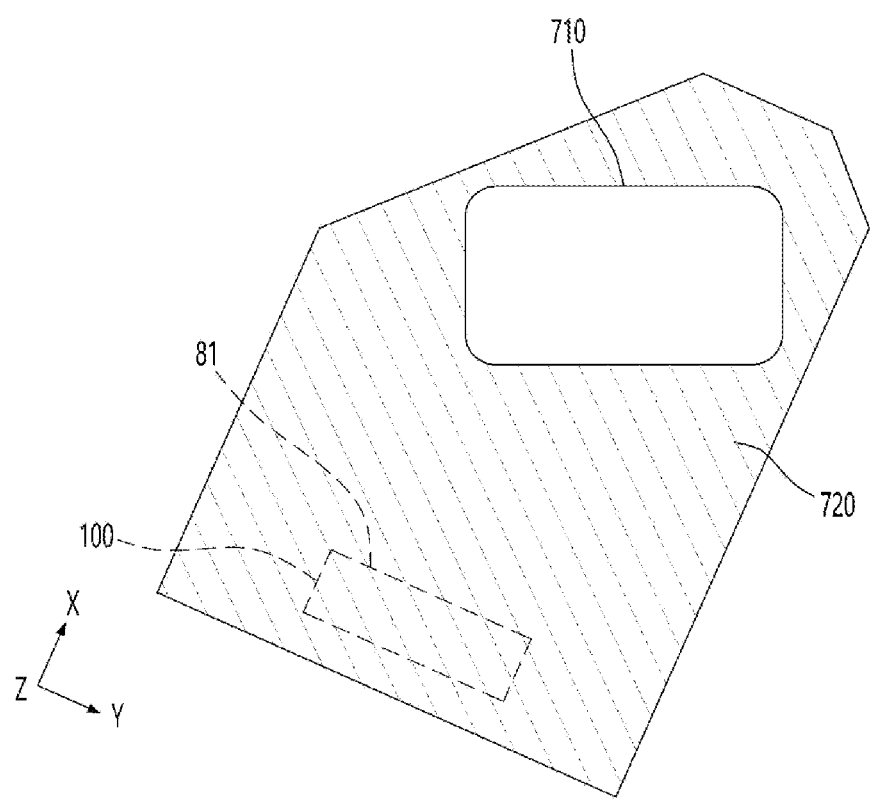
FIG. 16 is a cross-sectional view of a rear-view mirror assembly according to an embodiment.

FIG. 15 is an exploded perspective view of the rear-view mirror assembly according to the embodiment, and FIG. 16 is a cross-sectional view of the rear-view mirror assembly according to the embodiment. In addition, FIG. 17 is a top view of the blocking member according to the embodiment.

Figure 17:
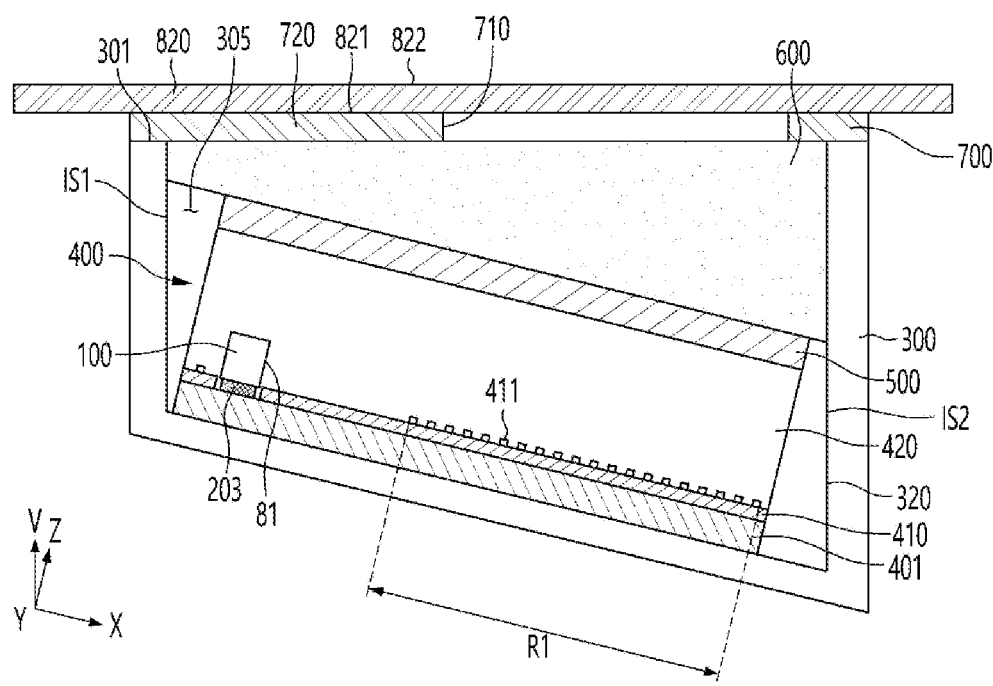
FIG. 17 is a top view of a blocking member according to an embodiment.

In the description of FIGS. 15 to 17, a structure in which the optical assembly 10 is applied to the left-side mirror adjacent to the driver's seat will be described. In the case of the right-side mirror adjacent to the passenger seat, the components of the optical assembly 10 is symmetrical to each other in the same shape, so for convenience of description, the structure applied to the left-side mirror adjacent to the driver's seat will be centered.

Referring to FIGS. 15 to 17, the rear-view mirror assembly 2000 may include a cover case 810, a mirror member 820, and an optical assembly 10.

The cover case 810 may be exposed to the outside of the vehicle. For example, the cover case 810 may be a cover of a side mirror disposed on the left and right-sides of the vehicle, respectively. The cover case 810 may include a material having predetermined rigidity and reliability. The cover case 810 may include a material capable of maintaining reliability from the outside in a vehicle stopping or driving environment.

The cover case 810 may include an opened one side and a receiving space 805 therein. The cover case 810 may accommodate the optical assembly 10 and the mirror member 820.

The mirror member 820 may be disposed in the receiving space 805 of the cover case 810. The mirror member 820 may be disposed so that a bottom surface 821 of the mirror member 820 faces the receiving space 805. An upper surface 822 of the mirror member 820 may be exposed to the outside. The bottom surface 821 and the upper surface 822 of the mirror member 820 may be provided as at least one of a flat surface and a curved surface. The mirror member 820 may be a semi-transparent member including a mirror or a display. The mirror member 820 may transmit the light emitted from the optical assembly 10. For example, a partial region of the mirror member 820, for example, a region overlapping the optical assembly 10 may transmit light emitted from the optical assembly 10.

The optical assembly 10 may be disposed in the receiving space 805 of the cover case 810. The optical assembly 10 may be disposed between the mirror member 820 and the cover case 810. For example, the optical assembly 10 may be disposed on the bottom surface 821 of the mirror member 820 facing the receiving space 805 of the cover case 810. The optical assembly 10 may emit light in the direction of the opened region of the cover case 810. The optical assembly 10 may emit light toward the bottom surface 821 of the mirror member 820.

In this case, the height between the lighting module 400 and the mirror member 820 may change. The vertical direction (V-axis direction) height between the upper surface of the lighting module 400 and the lower surface 821 of the mirror member 820 may increase in a direction from the first inner surface IS1 to the second inner surface IS2. In addition, although not shown in the drawings, the vertical (V-axis direction) height between the upper surface of the lighting module 400 and the lower surface 821 of the mirror member 820 may decrease in a direction from the third inner surface IS3 to the fourth inner surface IS4. And, the vertical height between the upper surface of the lighting module 400 and the lower surface 821 of the mirror member 820 may increase in a direction from the second intersection point P2 of the lighting module 400 to the fifth side surface S5.

A blocking member 700 may be disposed on the optical assembly 10. The blocking member 700 may be disposed between the optical assembly 10 and the mirror member 820. The blocking member 700 may be disposed in a region overlapping the optical assembly 10. The blocking member 700 may directly contact the bottom surface 821 of the mirror member 820.

The blocking member 700 may include an opening region 710 and a non-transmissive region 720.

The opening region 710 may be a region through which the light emitted from the optical assembly 10 is transmitted. That is, the light emitted from the optical assembly 10 may be emitted in the direction of the mirror member 820 through the opening region 710 and may be provided to the outside.

In addition, the non-transmissive region 720 may be a region other than the opening region 710, and may be a region through which the light emitted from the optical assembly 10 is not transmitted. For example, the non-transmissive region 720 may be implemented using black or white ink.

That is, the opening region 710 may be an effective region through which light is transmitted, and the non-transmissive region 720 may be an ineffective region through which light is not transmitted.

In this case, the light emitting device 100 of the optical assembly 10 may be disposed in a region overlapping the blocking member 700 in a vertical direction (V-axis direction). Here, the vertical direction (V-axis direction) may mean a height direction of the housing 300.

In detail, the light emitting device 100 may be disposed in a region that does not overlap the opening region 710 of the blocking member 700 in a vertical direction (V-axis direction), and may be overlapped with a vertical direction with the non-transmissive region 720.

Also, the opening region 710 may be disposed in a region overlapping the plurality of dots 411 of the reflective member 410 in a vertical direction (V-axis direction). For example, the opening region 710 may vertically overlap the region R1 in which the plurality of dots 411 are disposed. In this case, the light emitted from the light emitting device 100 may be reflected by the dots 411 to be effectively emitted in the direction of the opening region 710. Accordingly, loss of light emitted from the optical assembly 10 may be minimized.

In addition, when the optical assembly 10 includes the light blocking portion 425 as shown in FIG. 10, the light blocking portion 425 may be disposed in a region not overlap the opening region 710 of the blocking member 700 in the vertical direction (V-axis direction), and may be vertically overlapped with the non-transmissive region 720. Accordingly, it is possible to guide the light emitted from the light emitting device 100 to be emitted in the direction of the opening region 710.

Accordingly, in the embodiment, the loss of light emitted from the light emitting device 100 may be minimized, and the direction and luminance value of light emitted to the outside of the mirror member 820 through the opening region 710 may be controlled.

The rear-view mirror assembly 2000 may include an indicator portion 850. The indicator portion 850 may have a shape such as a logo, text, or icon. The indicator portion 850 may be formed on the mirror member 820. In detail, the indicator portion 850 may be formed in a region of the mirror member 820 that vertically overlaps with the opening region 710 of the blocking member 700. The indicator portion 850 may vertically overlap with the region R1 in which the plurality of dots 411 are disposed. The indicator portion 850 may be provided as an opening portion in the mirror member 820 or may be implemented using colored ink.

Accordingly, the light emitted from the optical assembly 10 may pass through the opening region 710 and the indicator portion 850, and a shape of the indicator portion 850 may be visually recognized from the outside of the mirror member 820.

In addition, the indicator portion 850 may be haze-treated. Accordingly, when light is not emitted from the optical assembly 10, the optical assembly 10 may not be viewed from the outside of the mirror member 820.

Also, although not shown in the drawings, the indicator portion 850 may be formed on the blocking member 700. In detail, the indicator portion 850 may be formed in the opening region 710 of the blocking member 700. Accordingly, the light emitted from the optical assembly 10 may pass through the indicator portion 850 formed in the opening region 710, and a shape of the indicator portion 850 may be visually recognized from the outside of the mirror member 820.

Also, although not shown in the drawings, the indicator portion 850 may be formed on the mirror member 820 and the blocking member 700. In detail, the indicator portion 850 may be formed in an opening region 710 of the blocking member 700 and a region of the mirror member 820 corresponding to the opening region 710, respectively. Accordingly, the shape of the indicator portion 850 visually recognized from the outside of the mirror member 820 may have a three-dimensional effect.

The rear-view mirror assembly 2000 may include a sensing unit (not shown) and a control unit (not shown).

The sensing unit may include a radar, a laser, a sound wave, an image sensor, and the like, and may be disposed at the rear and/or side of the vehicle. The sensing unit may detect another vehicle located at the rear and/or side of the vehicle.

The control unit is connected to the sensing unit and may control the operation of the optical assembly 10. For example, when there is another vehicle on the rear side of the vehicle, the sensing unit may detect information about the vehicle. Thereafter, the sensing unit may provide the sensed information to the control unit. Subsequently, the control unit may apply a signal for light emission ON to the optical assembly 10. Accordingly, the driver of the vehicle may visually recognize the shape of the logo and/or icon displayed on the upper surface 822 of the mirror member 820 through the optical assembly 10 and the blocking member 700, and information about the presence of another vehicle on the rear side of the vehicle may be provided.

Also, when the other vehicle disappears from the side and rear of the vehicle in which the driver is riding, the sensing unit may detect information about the other vehicle. Thereafter, the sensing unit may provide the sensed information to the control unit, and the control unit may apply a signal for turning off light emission to the optical assembly 10.

In this case, the lighting module 400 according to the embodiment may be inclined. In detail, an upper surface of the optical assembly 10 may contact the blocking member 700, and an upper surface of the blocking member 700 may contact a bottom surface 821 of the mirror member 820.

Accordingly, the lighting module 400 of the optical assembly 10 may be disposed to be inclined with respect to the bottom surface 821 of the mirror member 820. In detail, based on the direction from the first inner surface IS1 toward the second inner surface IS2, the lighting module 400 may be inclined at the first inclination angle a1. In addition, the lighting module 400 may be inclined at the second inclination angle a2 from the third inner surface IS3 toward the fourth inner surface IS4. That is, the lighting module 400 may be inclined in the direction of the fifth inner surface IS5 at the first intersection point P1 of the housing 300. In more detail, the bottom surface 310 of the housing 300 may be inclined as described above, and the lighting module 400 and the optical member 500 disposed on the bottom surface 310 may have an inclined shape at an inclination angle within the above-described range.

Accordingly, the rear-view mirror assembly 2000 according to the embodiment minimizes light loss and maximizes the amount of light emitted through the mirror member 820, and an exit direction of the emitted light and a luminance value of the light according to the exit direction may be controlled.

Figure 18:
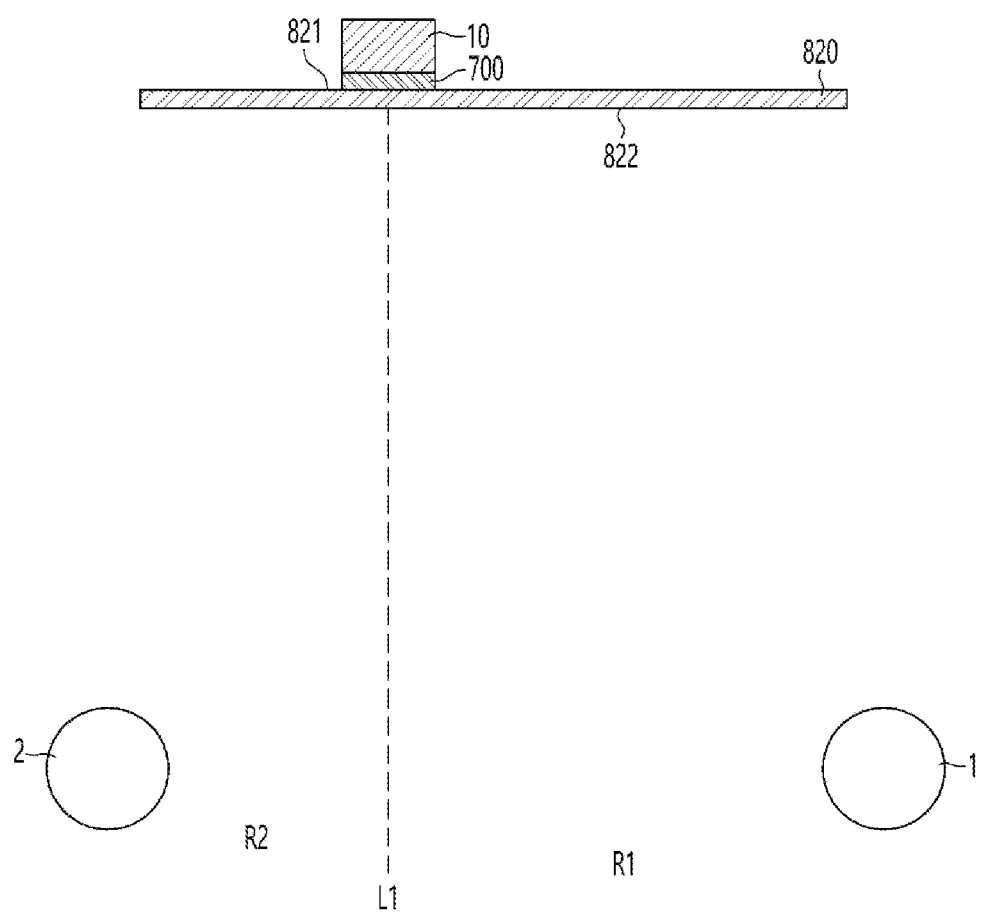
FIG. 18 is a view for explaining an emission angle of light emitted from the rear-view mirror assembly according to the embodiment.

FIG. 18 is a view for explaining an exit angle of light emitted from the rear-view mirror assembly according to the embodiment. In the description of FIG. 18, the description will be given of application to the left-side mirror adjacent to the driver's seat. In the case of the right-side mirror adjacent to the passenger seat, since the components including the optical assembly 10 are symmetrical to each other in the same shape, for convenience of description, the structure applied to the left-side mirror will be centered.

Referring to FIG. 18, the rear-view mirror assembly 2000 according to the embodiment may provide the driver with vehicle information located on the rear side. For example, in a region overlapping the optical assembly 10, the first region R1 and the second region R2 may be divided based on a virtual line L1 extending in a direction perpendicular to the extension direction of the rear-view mirror assembly 2000. Here, the first region R1 may be a region in which the driver 1 is located, and the second region R2 may be a region in which another vehicle 2 or an object located at the rear side of the vehicle in which the driver 1 is boarded is located.

In the rear-view mirror assembly 2000 according to the embodiment, when another vehicle 2 is located in the second region R2, the light emitted from the optical assembly 10 may be emitted to the outside through the blocking member 700 and the mirror member 820.

In this case, the lighting module 400 may be disposed to be inclined with respect to the bottom surface 310 of the mirror member 820 as described above. For example, the lighting module 400 may be disposed to be inclined in a direction corresponding to the first region R1 in which the driver 1 is located. Accordingly, the light emitted from the rear-view mirror assembly 2000 through the mirror member 820 may be emitted in a set direction and may have different luminance values according to the exit direction.

For example, the luminance value of the light emitted in the direction of the first region R1 where the driver 1 is located may be different from the luminance value of the light emitted in the direction of the second region R2 where the other vehicle 2 is located. In detail, the luminance value of the light emitted in the direction of the first region R1 may be greater than the luminance value of the light emitted in the direction of the second region R2.

Accordingly, the rear-view mirror assembly 2000 according to the embodiment may provide a high-luminance light to the driver 1 located in the first region R1. In addition, the rear-view mirror assembly 2000 may provide light of a relatively low luminance to the other vehicle 2 in the second region R2 located at the rear side of the vehicle of the driver 1.

Accordingly, the driver 1 may effectively visually recognize the shape of the indicator portion 850. In addition, the light emitted from the rear-view mirror assembly 2000 in the direction of the other vehicle 2 positioned at the rear side of the driver 1 may be minimized. Accordingly, it is possible to minimize or prevent the driver of the other vehicle 2 from being disturbed by the light.

Features, structures, effects, and the like described in the embodiments above are included in at least one embodiment of the invention, and are not necessarily limited to only one embodiment. Furthermore, the features, structures, effects, and the like illustrated in each embodiment may be combined or modified for other embodiments by a person having ordinary knowledge in the field to which the embodiments belong. Accordingly, contents related to such combinations and modifications should be construed as being included in the scope of the invention.

In addition, although the examples have been described above, these are only examples and do not limit the invention, and those of ordinary skill in the field to which the invention pertains are illustrated above within the scope not departing from the essential characteristics of the present embodiment. It will be seen that various modifications and applications that have not been made are possible. For example, each component specifically shown in the embodiment can be modified and implemented. And differences related to these modifications and applications should be construed as being included in the scope of the invention defined in the appended claims.

The invention claimed is:
1. An optical assembly comprising:
a housing including a receiving space in which an upper portion is opened, an inclined bottom surface within the receiving space, and a plurality of inner surfaces around the receiving space;
a lighting module disposed on the inclined bottom surface; and
an optical member disposed on the lighting module,
wherein the lighting module includes:
a substrate disposed on the inclined bottom surface;
at least one light emitting device disposed on the substrate; and a resin layer disposed on the light emitting device and the substrate, wherein the plurality of inner surfaces includes a first inner surface facing a first side of the lighting module, a second inner surface facing a second side of the lighting module opposite to the first side of the lighting module, a third inner surface facing a third side of the lighting module, and a fourth inner surface facing a fourth side of the lighting module opposite to the third side of the lighting module, and wherein a depth of the third inner surface within the receiving space of the housing is greater than a depth of the fourth inner surface.

2. The optical assembly of claim 1,
wherein the lighting module is inclined on the inclined bottom surface of the receiving space.

3. The optical assembly of claim 1,
wherein a vertical distance between an upper end of the fourth side of the lighting module and an upper end of the fourth inner surface of the housing is greater than a vertical distance between an upper end of the third side of the lighting module and the upper end of the third inner surface of the housing.

4. The optical assembly of claim 1,
wherein a length of the first side of the lighting module in a first direction is smaller than a length of the third side in a second direction, and
wherein the first direction and the second direction are perpendicular to each other, and the first side and the second side of the lighting module are disposed on opposite sides to each other with respect to the first direction.

5. The optical assembly of claim 4,
wherein a length of the third side of the lighting module in a second direction is greater than the length of the fourth side in the second direction.

6. The optical assembly of claim 1,
wherein thicknesses of the first to fourth side of the lighting module are substantially the same.

7. The optical assembly of claim 1,
wherein the light emitting device is disposed adjacent to the first side in the resin layer,
wherein a length of the fourth side of the lighting module in a second direction is smaller than the length of the third side in the second direction, and
wherein the third and fourth sides are disposed on opposite sides of the lighting module in the second direction.

8. The optical assembly of claim 7,
wherein the light emitting device emits light toward the second side of the lighting module, and
wherein an upper surface of the resin layer emits light by diffusing light emitted from the light emitting device.

9. The optical assembly of claim 1, comprising:
a cover member disposed on the optical member within the receiving space,
wherein the optical member is disposed between an upper surface of the lighting module and a lower surface of the cover member.

10. The optical assembly of claim 9,
wherein the upper surface of the cover member is substantially parallel to an upper surface of the housing, and
wherein the upper surface of the cover member is substantially disposed not parallel to the upper surface of the lighting module.

11. The optical assembly of claim 9,
wherein a lower surface of the cover member is inclined with respect to the upper surface of the cover member.

12. The optical assembly of claim 1,
wherein the optical assembly includes a rear-view mirror assembly of a vehicle.

13. A rear-view mirror assembly comprising:
an optical assembly comprises:
a housing including a receiving space in which an upper portion is opened and an inclined bottom surface within the receiving space;
a lighting module disposed on the inclined bottom surface; and
an optical member disposed on the lighting module within the receiving space;
a mirror member disposed on the optical member of the optical assembly; and
a blocking member disposed between the housing and the mirror member,
wherein the blocking member includes an opening region and a non-transmissive region,
wherein the opening region of the blocking member is a region through which light emitted from the optical assembly is transmitted,
wherein the light emitted from the optical assembly is emitted in a direction of the mirror member through the opening region and is provided to an outside,
wherein the rear-view mirror assembly includes a first region and a second region based on a virtual line overlapping the optical assembly and extending in a direction perpendicular to an extension direction of the mirror member,
wherein the first region is a region where a driver of a vehicle is located, and the second region is a region where another vehicle or object is located outside a region where the driver is located, and
wherein a luminance value of light emitted in a direction of the first region from the optical assembly is greater than a luminance value of light emitted in a direction of the second region from the optical assembly.

14. The rear-view mirror assembly of claim 13,
wherein the lighting module includes:
a substrate disposed on the inclined bottom surface;
at least one light emitting device disposed on the substrate; and
a resin layer disposed on the light emitting device and the substrate.

15. The rear-view mirror assembly claim 14,
wherein the lighting module is inclined with respect to the mirror member.

16. The rear-view mirror assembly of 14,
wherein the housing includes a plurality of inner surface around the receiving space, and
wherein the plurality of inner surfaces includes a first inner surface facing a first side of the lighting module, a second inner surface facing a second side opposite of the lighting module to the first side of the lighting module, a third inner surface facing a third side of the lighting module, and a fourth inner surface facing a fourth side of the lighting module opposite to the third side of the lighting module.

17. The rear-view mirror assembly of 16,
wherein a depth of the third inner surface within the receiving space of the housing is greater than a depth of the fourth inner surface.

18. The rear-view mirror assembly of claim 16,
wherein a vertical distance between an upper end of the fourth side of the lighting module and an upper end of the fourth inner surface of the housing is greater than a vertical distance between an upper end of the third side of the lighting module and the upper end of the third inner surface of the housing, wherein a length of the first side of the lighting module in a first direction is smaller than a length of the third side in a second direction, and wherein the first direction and the second direction are perpendicular to each other, and the first side and the second side of the lighting module are disposed on opposite sides to each other with respect to the first direction.

19. The rear-view mirror assembly of claim 18, wherein a length of the third side of the lighting module in a second direction is greater than the length of the fourth side in the second direction.

20. The optical assembly of claim 14, wherein thicknesses of the first to fourth side of the lighting module are substantially the same, wherein the light emitting device is disposed adjacent to the first side in the resin layer, wherein the light emitting device emits light toward the second side of the lighting module, and wherein an upper surface of the resin layer emits light by diffusing light emitted from the light emitting device.

* * * * *